United States Patent
Gao

(10) Patent No.: US 11,323,208 B2
(45) Date of Patent: May 3, 2022

(54) METHOD OF TRANSMITTING HYBRID AUTOMATIC RETRANSMISSION REQUEST ACKNOWLEDGMENT CODEBOOK AND DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/278,600

(22) PCT Filed: Sep. 20, 2019

(86) PCT No.: PCT/CN2019/107029
§ 371 (c)(1),
(2) Date: Mar. 22, 2021

(87) PCT Pub. No.: WO2020/057639
PCT Pub. Date: Mar. 26, 2020

(65) Prior Publication Data
US 2021/0314095 A1  Oct. 7, 2021

(30) Foreign Application Priority Data
Sep. 21, 2018 (CN) .......................... 201811109875.X

(51) Int. Cl.
*H04L 1/18* (2006.01)
*H04W 72/12* (2009.01)
*H04W 72/04* (2009.01)

(52) U.S. Cl.
CPC .......... *H04L 1/1812* (2013.01); *H04L 1/1887* (2013.01); *H04W 72/04* (2013.01); *H04W 72/1268* (2013.01); *H04W 72/1289* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2014/0293884 A1* 10/2014 Larsson ................ H04L 1/0073
370/329
2017/0012685 A1   1/2017 Ko et al.
(Continued)

FOREIGN PATENT DOCUMENTS

CN   107852285 A  *  3/2018   .......... H04L 1/1887
CN   107852285 A     3/2018
(Continued)

OTHER PUBLICATIONS

3GPP TSG RAN WG1 Meeting #94, Gothenburg, Sweden, Aug. 20-24, 2018, R1-1809635, Draft Change Request, Title: Correction for HARQ-ACK delay in eMTC, Source to WG: Qualcomm Incorporated, Ericsson, Work item code: LTE _feMTC-Core, Date Aug. 10, 2018. (Year: 2018).*
(Continued)

*Primary Examiner* — Peter G Solinsky
*Assistant Examiner* — Sanjay K Dewan
(74) *Attorney, Agent, or Firm* — Ladas & Parry, LLP

(57) ABSTRACT

A method of transmitting a hybrid automatic retransmission request acknowledgment codebook and a device are provided, and the method includes: sending a semi-static HARQ-ACK codebook, wherein the semi-static HARQ-ACK codebook does not include HARQ-ACK feedback information corresponding to a target downlink transmis-
(Continued)

Sending a semi-static HARQ-ACK codebook, wherein the semi-static HARQ-ACK codebook does not include HARQ-ACK feedback information corresponding to a target downlink transmission — 401 sion, the target downlink transmission includes at least one of the following transmissions: a first downlink transmission that does not meet a processing delay requirement; a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

20 Claims, 6 Drawing Sheets

(58) Field of Classification Search
USPC .......................................................... 370/329
See application file for complete search history.

(56) References Cited

U.S. PATENT DOCUMENTS

| 2017/0134140 | A1 | 5/2017 | Park |
| 2018/0167173 | A1 | 6/2018 | Guan et al. |
| 2018/0323938 | A1 | 11/2018 | Takeda et al. |
| 2019/0393994 | A1 | 12/2019 | Liang et al. |
| 2020/0145138 | A1* | 5/2020 | Bhattad ................. H04L 1/1864 |
| 2020/0313803 | A1* | 10/2020 | Khoshnevisan ...... H04L 5/0055 |
| 2021/0050948 | A1 | 2/2021 | Gao et al. |
| 2021/0203451 | A1* | 7/2021 | Lei ......................... H04L 1/1896 |
| 2021/0211237 | A1* | 7/2021 | Yang ..................... H04L 5/0055 |
| 2021/0234640 | A1* | 7/2021 | Cirik ................. H04W 72/0446 |

FOREIGN PATENT DOCUMENTS

| CN | 107888343 | A | * | 4/2018 | ........... H04L 1/1812 |
| CN | 107888343 | A | | 4/2018 | |
| CN | 108353312 | A | | 7/2018 | |
| CN | 110138514 | A | * | 8/2019 | ........... H04L 1/1854 |
| CN | 110138514 | A | | 8/2019 | |
| CN | WO 2020057639 | A1 | * | 3/2020 | ........... H04L 1/1812 |
| KR | WO 2018/128474 | A1 | * | 7/2018 | ............... H04L 5/00 |
| WO | 2017/192025 | A1 | | 11/2017 | |
| WO | WO 2018/128474 | A1 | | 7/2018 | |

OTHER PUBLICATIONS

3GPP TSG-RAN WG1 Meeting #92 bis, Sanya, China, Apr. 16-20, 2018, R1-1804762, Source: Nokia, Nokia Shanghai Bell, Title: On remaining details of BWPs, Agenda Item: 7.1.3.4.1. (Year: 2018).*
3GPP TSG RAN WG1 Meeting 91, Reno, USA, Nov. 27-Dec. 1, 2017, R1-1720822, Source: NTT Docomo, Inc., Title: DL/UL scheduling and HARQ Management, Agenda item: 7.3.3.2. (Year: 2017).*
International Search Report and Written Opinion for International Application No. PCT/CN2019/107029 dated Nov. 28, 2019.
Qualcomm Incorporated, et al., "Correction for HARQ-ACK delay in eMTC," R1-1809635, 3GPP TSG RAN WG1 Meeting #94, Aug. 2018, entire document.
Nokia, Nokia Shanghai Bell, "On remaining details of BWPs," R1-1804762, 3GPP TSG-RAN WG1 meeting #92bis, Apr. 2018, entire document.
Office Action issued for corresponding Chinese Application No. 201811109875.X dated Aug. 20, 2020.
NTT Docomo, Inc., "DL/UL scheduling and HARQ management," 3GPP TSG RAN WG1 Meeting 91, R1-1720822, Nov. 2017, entire document.
Extended European Search Report from corresponding EP app. No. 19862981.8, dated Oct. 18, 2021, all pages.
Huawei, HiSilicon, "Summary of remaining issues on HARQ, management", R1-1800036, 3GPP TSG RAN WG1 Meeting Ad Hoc, Vancouver, Canada, Jan. 22nd-26th, 2018, all pages.
Office Action from IN app. No. 202147016208, dated Feb. 9, 2022, all pages.

* cited by examiner

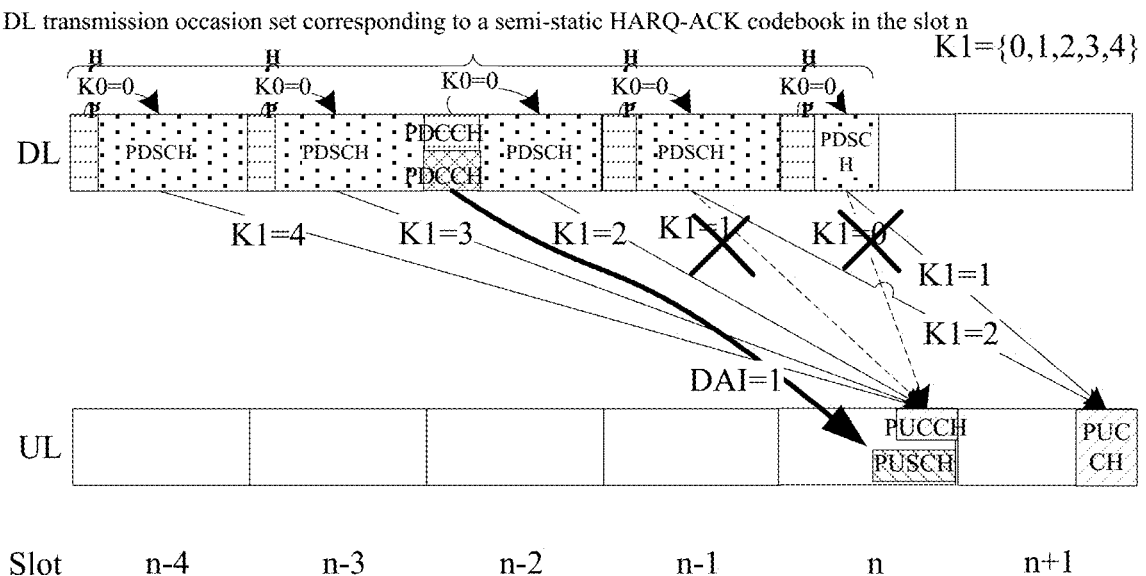

Fig.3

| Sending a semi-static HARQ-ACK codebook, wherein the semi-static HARQ-ACK codebook does not include HARQ-ACK feedback information corresponding to a target downlink transmission | 401 |

Fig.4

| Receiving a semi-static HARQ-ACK codebook, wherein the semi-static HARQ-ACK codebook does not include HARQ-ACK feedback information corresponding to a target downlink transmission | 501 |

Fig.5

METHOD OF TRANSMITTING HYBRID AUTOMATIC RETRANSMISSION REQUEST ACKNOWLEDGMENT CODEBOOK AND DEVICE

CROSS-REFERENCE TO RELATED APPLICATIONS

This application is the U.S. national phase of PCT Application No. PCT/CN2019/107029 filed on Sep. 20, 2019, which claims priority to Chinese Patent Application No. 201811109875.X filed in China on Sep. 21, 2018, the disclosures of which are incorporated in their entireties by reference herein.

TECHNICAL FIELD

Embodiments of the present disclosure relate to the field of communication technologies, in particular to a method of transmitting a hybrid automatic retransmission request acknowledgment codebook and a device.

BACKGROUND

A semi-static Hybrid Automatic Repeat reQuest-Acknowledgment codebook (Semi-static HARQ-ACK codebook) is supported in fifth-generation New Radio (5G NR) access technologies. The so-called semi-static HARQ-ACK codebook means that a Hybrid Automatic Repeat reQuest-Acknowledgment codebook (HARQ-ACK codebook) is always transmitted according to a fixed size. That is, a size of a sequence for HARQ-ACK feedbacks will not change as change of scheduling situation. A main purpose is to avoid a problem of inconsistent understanding of a size of the HARQ-ACK codebook between a base station and a terminal caused by a packet loss in a downlink transmission.

A process of determining the semi-static HARQ-ACK codebook in the related art is as follows. Firstly, according to a pre-configured HARQ-ACK feedback timing set and a Physical Downlink Shared CHannel (PDSCH) candidate time domain resource set, a downlink transmission occasion set corresponding to a slot for transmitting HARQ-ACKs is determined. The HARQ-ACK feedback timing expresses a slot interval between a slot, where a downlink transmission that requires a HARQ-ACK feedback is located, and a slot for the HARQ-ACK transmission. A K1 set may be used to express a HARQ-ACK feedback time sequence set. Each value in the set may give a HARQ-ACK feedback timing, and the set may include only one value or more than one value. The PDSCH candidate time domain resource set is a table pre-configured by a high-level signaling, which usually includes multiple rows (for example, 16 rows), and each row includes at least a start symbol position, a transmission duration, and scheduling timing K0, wherein K0 represents a slot interval between a Physical Downlink Control Channel (PDCCH) and a scheduled PDSCH, and specific information combinations for different rows are different. An indication field in multiple PDCCHs scheduling a PDSCH may indicate one row to the terminal, and then a PDSCH transmission slot and a specific symbol position in the slot may be determined according to the information included therein.

Specifically, a downlink transmission slot set corresponding to a time slot may be determined according to the HARQ-ACK feedback time sequence set. For example, if a HARQ-ACK is transmitted in a slot n, a corresponding downlink transmission slot set may be determined according to n−k, wherein k∈K1. In each slot in the downlink transmission slot set, it is further determined according to a time domain position in the PDSCH candidate time domain resource set and UE capability whether each time slot includes an effective downlink transmission occasions and how many effective downlink transmission occasions are included; wherein, the effective occasion means that there is at least one time domain position in the PDSCH candidate time domain resource set that does not conflict with an uplink and downlink ratio in this time slot, if any time domain position conflicts with the uplink and downlink ratio in this slot, and the slot may be removed from the downlink transmission slot set. For example, an uplink slot, or a slot with most uplink symbols is determined according to n−k, wherein there is no or insufficient symbol set for any time domain resource transmission in the PDSCH candidate time domain resource set, for example, time domain resource transmission occupies 8 downlink symbols, but there are no 8 downlink symbols or flexible symbols in the slot. Each slot specifically includes one or more downlink transmissions, which depends on the UE capability. If the UE is not capable of supporting analysis of multiple downlink transmissions in a slot, there is at most one downlink transmission in a slot; if the UE is capable of supporting analysis of multiple downlink transmissions in a slot, there may be more than one downlink transmission in a slot. The downlink transmission here includes a PDSCH requiring a HARQ-ACK feedback or a SPS PDSCH release. Then a HARQ-ACK is generated for an actual received downlink transmission in a downlink transmission occasion set and maps to a corresponding position in a semi-static HARQ-ACK codebook, wherein a size of the semi-static HARQ-ACK codebook is always determined according to a quantity of elements in the above downlink transmission occasion set. That is, regardless of a certain slot in a downlink transmission occasion set determined in the above-mentioned manner, and regardless of whether a downlink transmission requiring a HARQ-ACK feedback is received in a certain downlink transmission occasion in the slot, feedback information need to be generated for this downlink transmission occasion. Therefore, a quantity of bits of feedback information included in the semi-static HARQ-ACK codebook does not vary with how many downlink transmissions are actually scheduled. A NACK is generated at positions where no downlink transmission is received in the downlink transmission occasion set or where a downlink transmission is received but a HARQ-ACK feedback is not performed in a current slot based on an actual K1 indication.

It can be seen that, the scheme of transmitting the semi-static HARQ-ACK codebook in the related art increases redundant information of the semi-static HARQ-ACK codebook and reduces the HARQ-ACK transmission efficiency and performance.

SUMMARY

An objective of embodiments of the present disclosure is to provide a method of transmitting a hybrid automatic repeat request acknowledgment codebook and a device. On a basis that the terminal and the base station have the same understanding of a quantity of HARQ-ACK transmission bits, redundant HARQ-ACK feedbacks are reduced, and HARQ-ACK transmission efficiency and performance are improved.

An embodiment of the present disclosure provides a method of transmitting a hybrid automatic retransmission request acknowledgment (HARQ-ACK) codebook, and the method is applied to a terminal and includes:

sending a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

An embodiment of the present disclosure further provides a method of transmitting a hybrid automatic retransmission request acknowledgment (HARQ-ACK) codebook, and the method is applied to a base station and includes:

receiving a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

An embodiment of the present disclosure further provides a terminal, and the terminal includes: a transceiver, a storage, a processor and a program stored on the storage and executable by the processor; wherein, the transceiver is configured to send a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

An embodiment of the present disclosure further provides a terminal, and the terminal includes:

a sending unit, configured to send a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

An embodiment of the present disclosure further provides a base station, and the base station includes: a transceiver, a storage, a processor and a program stored on the storage and executable by the processor; wherein, the transceiver is configured to receive a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

An embodiment of the present disclosure further provides another base station, and the base station includes: a reception unit, configured to receive a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

According to the method of transmitting the hybrid automatic repeat request acknowledgment codebook and the device provided by embodiments of the present disclosure, the HARQ-ACK of the downlink transmission, that may not be included and may be determined based on a HARQ-ACK feedback processing delay and/or UL grant, is removed in the semi-static HARQ-ACK codebook, on a basis of ensuring that the terminal and the base station have consistent understanding of a quantity of HARQ-ACK transmission bits, redundant HARQ-ACK feedbacks may be reduced, and system efficiency and HARQ-ACK transmission performance may be improved.

BRIEF DESCRIPTION OF THE DRAWINGS

In order to more clearly illustrate the technical solutions in embodiments of the present disclosure, the drawings used in the description of the embodiments of the present disclosure will be briefly introduced below. Obviously, the drawings in the following description are only some embodiments of the present disclosure. Based on these drawings, other drawings may be obtained by those skilled in the art without any creative work.

FIG. 3 is another example of a HARQ-ACK feedback in related art;

FIG. 4 is a flowchart of a method of transmitting a HARQ-ACK codebook according to an embodiment of the present disclosure;

FIG. 5 is another flowchart of a method of transmitting a HARQ-ACK codebook according to an embodiment of the present disclosure;

DETAILED DESCRIPTION

Figure 1:
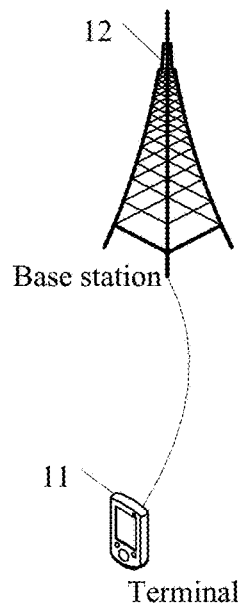
FIG. 1 is a block diagram of a wireless communication system to which an embodiment of the present disclosure may be applied.

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by embodiments described herein. Rather, these embodiments are provided to enable a more thorough understanding of the present disclosure, and will fully convey the scope of the present disclosure to those skilled in the art.

The terms "first", "second", and the like in the specification and claims of the present disclosure are used to distinguish similar objects, and are not necessarily used to describe a particular order or chronological order. It is to be understood that the data so used may be interchangeable under appropriate circumstances, so that the embodiments of the present application described herein can be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. The term "and/or" in the specification and claims indicates at least one of connected objects.

The technology described herein is not limited to Long Time Evolution (LTE)/LTE-Advanced (LTE-A) and NR systems, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. CDMA systems may implement radio technologies such as CDMA2000 and Universal Terrestrial Radio Access (UTRA). The UTRA includes Wideband Code Division Multiple Access (WCDMA) and other CDMA variants. TDMA systems may implement radio technologies such as Global System for Mobile Communication (GSM). The OFDM systems may implement radio technologies such as Ultra Mobile Broadband (UMB), Evolution-UTRA (E-UTRA), IEEE 1102.11 (Wi-Fi), IEEE 1102.16 (WiMAX), IEEE 1102.20, and Flash-OFDM. The UTRA and the E-UTRA are part of an Universal Mobile Telecommunications System (UMTS). The LTE and more advanced LTE (such as LTE-A) are new UMTS versions that use the E-UTRA. The UTRA, the E-UTRA, the UMTS, the LTE, the LTE-A, and the GSM are described in documents from an organization named "3rd Generation Partnership Project" (3GPP). The CDMA2000 and the UMB are described in documents from an organization named "3rd Generation Partnership Project 2" (3GPP2). The technologies described herein may be used for the systems and radio technologies mentioned above, as well as other systems and radio technologies. However, the following description describes an NR system for exemplary purposes, and NR terminology is used in most of the description below, although these technologies may also be applied to applications other than NR system applications.

The following description provides examples and does not limit the scope, applicability, or configuration set forth in the claims. Changes may be made to functions and arrangements of the discussed elements without departing from spirit and scope of the present disclosure. Various examples may omit, substitute, or add various procedures or components as appropriate. For example, the described method may be performed in an order different from that described, and various steps may be added, omitted, or combined. In addition, features described with reference to certain examples may be combined in other examples.

Referring to FIG. 1, FIG. 1 shows a block diagram of a wireless communication system to which an embodiment of the present disclosure may be applied. The wireless communication system includes a terminal 11 and a base station 12. The terminal 11 may also be referred to as terminal equipment or UE (User Equipment). The terminal 11 may be a mobile phone, a tablet personal computer, a laptop computer, a personal digital assistant (PDA), a mobile Internet device (MID), a wearable device or an in-vehicle device and other terminal side devices, it should be noted that a specific type of the terminal 11 is not limited in an embodiment of the present disclosure. The base station 12 may be a base station of 5G and later versions (such as, a next generation node base station (gNB), a 5G new radio node base station (5G NR NB), etc.), or a base station in other communication systems (such as, an evolved node base station (eNB), an access point in a wireless local area network (WLAN), or other access points, etc.), wherein the base station may be called a Node B, an evolved Node B, an access point, a Base Transceiver Station (BTS), a radio base station, a radio transceiver, a Basic Service Set (BSS), an Extended Service Set (ESS), a NodeB, an evolved Node B (eNB), a home Node B, a home evolved Node B, a WLAN access point, a WiFi node, or some other appropriate terms in the field, as long as the same technical effect is achieved, the base station is not limited to specific technical vocabulary. It should be noted that, in an embodiment of the present disclosure, only the base station in the NR system is taken as an example, but the specific type of the base station is not limited.

The base station 12 may communicate with the terminal 11 under the control of the base station controller. In various examples, the base station controller may be a part of a core network or part of some base stations. Some base stations may communicate control information or user data with a core network through backhaul. In some examples, some of these base stations may directly or indirectly communicate with each other through a backhaul link, and the backhaul link may be a wired or wireless communication link. The wireless communication system may support operations on multiple carriers (waveform signals of different frequencies). A multi-carrier transmitter may simultaneously transmit modulated signals on these multiple carriers. For example, each communication link may be a multi-carrier signal modulated based on various radio technologies. Each modulated signal may be sent on different carriers and may carry control information (such as, reference signals, control channels, etc.), overhead information, data, and so on.

The base station 12 may perform wireless communicate with the terminal 11 via one or more access point antennas. Each base station may provide communication coverage for corresponding coverage area thereof. Coverage area of an access point may be divided into sectors that constitute only a part of the coverage area. The wireless communication system may include different types of base stations (such as, macro base stations, micro base stations, or pico base stations). The base station may also use different radio technologies, such as cellular or WLAN radio access technologies. The base stations may be associated with the same or different access networks or operator deployments. Coverage areas of different base stations (including coverage areas of the same or different types of base stations, coverage areas using the same or different radio technologies, or coverage areas belonging to the same or different access networks) may overlap.

Communication links in the wireless communication system may include an uplink for carrying uplink (UL) transmission (for example, from the terminal 11 to the base station 12), or a downlink for carrying downlink (DL) transmission (for example, from the base station 12 to the user device 11). The UL transmission may also be referred to as reverse link transmission, and the DL transmission may also be referred to as forward link transmission. The downlink transmission may be performed on a licensed band, an unlicensed band or both. Similarity, the uplink transmission may be performed on a licensed band, an unlicensed band or both.

Figure 2:
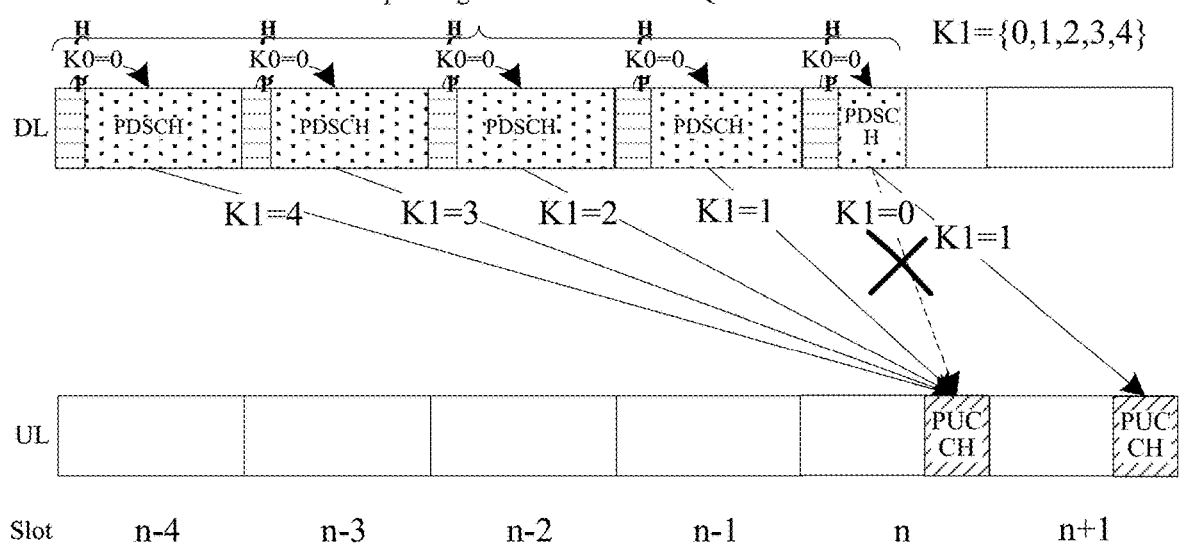
FIG. 2 is an example of a HARQ-ACK feedback in related art.

As described in the background, the downlink transmission occasion set provides a set of positions of all possible downlink transmissions that require HARQ-ACK feedbacks in a feedback slot. However, according to actual scheduling and transmission requirements, for downlink transmissions at some downlink transmission positions in the above downlink transmission occasion set, HARQ-ACK feedback may not be performed in the corresponding slot due to an unsatisfactory processing delay, such as unsatisfactory analysis time of a downlink transmission (such as PDSCH) and/or an unsatisfactory time requirement for preparing a corresponding HARQ-ACK transmission. For example, according to K1={0,1,2,3,4}, and assuming that there is a downlink transmission occasion in each slot, a downlink transmission occasion set corresponding to a slot n may be acquired as shown in FIG. 2, i.e., there is one PDSCH transmission occasion in each slot within a range of a slot n−4 to a slot n. However, since a downlink transmission in the slot n is too close to a corresponding HARQ-ACK transmission position, a corresponding HARQ-ACK feedback may not be performed in the slot n due to uncompleted processing of the PDSCH in the slot n (for example, a PDSCH analysis and/or a corresponding HARQ-ACK preparation has not been completed). Currently, it is specified that, for a downlink transmission that does not satisfy a processing delay in a downlink transmission occasion set corresponding to a semi-static HARQ-ACK codebook, NACKs are generated at feedback bit positions of corresponding these downlink transmissions in the semi-static HARQ-ACK codebook as feedback information.

In addition, in a case that the terminal has both a Physical Uplink Shared Channel (PUSCH) transmission and an Uplink Control Information (UCI) transmission in a certain slot, time domain resources of a Physical Uplink Control Channel (PUCCH) carrying UCI and a PUSCH may overlap. At this time, in a case that the terminal does not support simultaneous transmission of the PUCCH and the PUSCH, the UCI carried on the PUCCH needs to be transferred to the PUSCH for transmission, so as to avoid parallel transmission of multiple channels. In a case that the PUSCH has a corresponding PDCCH (i.e., scheduled by an UL grant) and the PDCCH uses Downlink Control Information (DCI) format 0_1, when a semi-static HARQ-ACK codebook is configured and used, the DCI format 0_1 includes 1 bit of Downlink Assignment Index (DAI), usually called UL DAI and used to indicate whether a HARQ-ACK exists on the PUSCH. This is because if there is no DAI indicator in the DCI format 0_1, in a case that the terminal does not receive any downlink transmission in a downlink transmission occasion set corresponding to the semi-static HARQ-ACK codebook in a slot where the PUSCH is located, the UE determines that there is no HARQ-ACK transmission on the PUSCH. At this time, if the terminal has a downlink transmission packet loss, it will cause the terminal and the base station to have inconsistent understanding of whether there is a HARQ-ACK transmission on the PUSCH. If a HARQ-ACK is transmitted on the PUSCH using rate matching, whether a HARQ-ACK exists will affect coding and rate matching of data (i.e., a code rate of data) on the PUSCH and an actual mapping resource position. If understanding of a HARQ-ACK of a base station (such as gNB) is inconsistent with an actual transmission of a UE, it will lead the base station to decode the PUSCH incorrectly, resulting in PUSCH reception failure, and will increase a probability of incorrect analysis of a HARQ-ACK feedback by the base station.

A 1-bit DAI in a PDCCH scheduling a PUSCH may only be counted based on downlink scheduling that occurs no later than its transmission position, and may not predict subsequent downlink transmissions that occur thereafter; therefore, it is currently specified that when a HARQ-ACK is transmitted on a PUSCH and a semi-static HARQ-ACK codebook is configured to use, a NACK is generated at a corresponding position, where a PDSCH scheduled by a PDCCH following the PDCCH of the PUSCH or a SPS PDSCH release (the SPS PDSCH release is a PDCCH used to indicate release of a downlink SPS resource) is scheduled, in the semi-static HARQ-ACK codebook, that is, a corresponding HARQ-ACK may not be transmitted on the PUSCH for the PDSCH scheduled by the PDCCH later than the UL grant, but in order to ensure stability of the semi-static HARQ-ACK codebook, the NACK is required as a placeholder. That is, as shown in FIG. 3, since a PDCCH scheduling a PUSCH in a slot n is transmitted in a slot n−2, a PDSCH in a slot n−1 is scheduled by a PDCCH in the slot n−1, a PDSCH in a slot n is scheduled by a PDCCH in the slot n, and the PDCCH is later than a PDCCH of a PUSCH in the scheduling slot n. Therefore, a HARQ-ACK may not be transmitted on the PUSCH in the slot n for the PDSCHs in the slots n−1 and n, NACKs are generated at positions of corresponding downlink transmissions in the slots n−1 and n in the semi-static HARQ-ACK codebook in the slot n as feedback information.

For FIG. 2, if it is determined according to the processing capability that the downlink transmission in the slot n does not meet the processing delay, under reasonable circumstances, the base station does not configure the downlink transmission in the slot n requiring a HARQ-ACK feedback in the slot n during scheduling, a reason is that a minimum processing delay may be determined by both the base station and the terminal. In this case, a more reasonable processing way for the base station is to set K1 corresponding to the PDSCH in the slot n to 1 or a value greater than 1, and a HARQ-ACK feedback is performed in a slot n+1 or later for the PDSCH in the slot n, and the slot for the HARQ-ACK feedback should be a slot that may meet the processing delay, otherwise even if the base station schedules the PDSCH in the slot n, and configures a HARQ-ACK feedback to be performed in slot n, the base station will never acquire real HARQ-ACK information of the PDSCH. Therefore, such scheduling should be avoided by the base station. The semi-static HARQ-ACK codebook corresponding to the slot n will not include these HARQ-ACKs for downlink transmissions that do not meet the processing delay, setting NACKs as feedback information for these downlink transmissions is actually a redundant transmission.

In particular, when there is carrier aggregation, a K1 set is a shared set of multiple downlink carriers, and the K1 may include an union of values of K1 required by multiple carriers separately. Therefore, for a downlink carrier, the K1 set may include one or more values of K1 that may not be used for this carrier. For example, carrier 1 needs K1={0, 1,2}, carrier 2 needs K1={3,4,5}, and the K1 set actually configured for the terminal is K1={01,2,3,4,5}, for the carrier 2, {0,1,2} in the K1 set are the K1 values that will not be used by a transmission on this carrier. However, when a size of a semi-static HARQ-ACK codebook of the carrier 2 is calculated in the related art, the codebook is always determined according to the K1 set as {01,2,3,4,5}, so there is multi-bit redundancy.

For FIG. 3, since scheduling information is sent by the base station, when the base station determines to send a PDCCH in a slot n−2 to schedule PUSCH transmission in the slot n. According to the above-mentioned rule of "a HARQ-ACK feedback may not be performed on the PUSCH for downlink transmission scheduled by the PDCCH sent after the PDCCH scheduling the PUSCH", in order to avoid that the base station schedules a downlink transmission, but may not acquire its corresponding HARQ-ACK, the base station should set a corresponding feedback timing for a PDSCH scheduled by a PDCCH after the slot n−2 to avoid a HARQ-ACK feedback to be performed in the slot n. For example, K1 equal to 2 or a larger value is set for the PDSCH in the slot n−1, so that a HARQ-ACK feedback is performed after the slot n for the PDSCH, so as to prevent the terminal does not transmit a real HARQ-ACK for this PDSCH. Therefore, the semi-static HARQ-ACK codebook corresponding to the slot n will not include these HARQ-ACKs for downlink transmissions scheduled by the PDCCH sent after the PDCCH scheduling the PUSCH, and setting NACKs for these downlink transmissions as feedback information is actually a redundant transmission.

In view of the above problems, an embodiment of the present disclosure provides a method of transmitting a hybrid automatic retransmission request acknowledgment codebook, which may reduce or avoid HARQ-ACK redundant transmission and improve HARQ-ACK transmission efficiency. Referring to FIG. 4, an embodiment of the present disclosure provides a method of transmitting a HARQ-ACK codebook, and the method is applied to a terminal side and includes Step 401.

Step 401: sending a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Here, the first downlink transmission is a downlink transmission that fails to meet the processing delay requirement. Specifically, the first downlink transmission may include one or more of the following transmissions: a PDSCH scheduled by a PDCCH, a Semi-Persistent Scheduling (SPS) PDSCH, and a SPS PDSCH release. The second downlink transmission may include one or more of the following transmissions: a Physical Downlink Shared Channel (PDSCH) scheduled by a PDCCH and a SPS PDSCH release.

The SPS PDSCH is a PDSCH without a corresponding PDCCH, that is, a PDSCH without PDCCH scheduling.

The SPS PDSCH release is a PDCCH indicating release of a downlink SPS resource. The SPS PDCCH release is equivalent to the PDCCH indicating the release of the downlink SPS resource. When the second downlink transmission is the PDCCH indicating the release of the downlink SPS resource or the SPS PDCCH release, the HARQ-ACK feedback is for the PDCCH itself indicating the release of the SPS resource. In a case that the second downlink transmission is the PDSCH, the second downlink transmission corresponding to the second PDCCH following the first PDCCH is a PDSCH scheduled by the second PDCCH. In a case that the second downlink transmission is the SPS PDSCH release, it is the same as the first PDCCH, the second downlink transmission corresponding to the second PDCCH following the first PDCCH is a SPS PDSCH release indicated by the second PDCCH.

In this article, a downlink transmission (or PDSCH) corresponding to a certain PDCCH may refer to a downlink transmission (or PDSCH) scheduled by the PDCCH. Similarly, a PDCCH corresponding to a certain downlink transmission (or PDSCH) may refer to a PDCCH scheduling the downlink transmission (or PDSCH).

As can be seen from the above step, in the embodiment of the present disclosure, when the terminal is configured to use the semi-static HARQ-ACK codebook, the transmitted semi-static HARQ-ACK codebook does not include the HARQ-ACK corresponding to the target downlink transmission. Therefore, the embodiment of the present disclosure may reduce or avoid redundant feedback information of the aforementioned target downlink transmission, improve a HARQ-ACK transmission efficiency, and improve a system transmission performance.

In order to reduce or avoid the redundant feedback information of the target downlink transmission and improve the transmission efficiency, prior to transmitting the semi-static HARQ-ACK codebook, the terminal may firstly determine the downlink transmission occasion set corresponding to the semi-static HARQ-ACK codebook, determine the target downlink transmission, and remove the target downlink transmission in the downlink transmission occasion set to acquire a final downlink transmission occasion set; then generate the corresponding semi-static HARQ-ACK codebook according to the downlink transmission occasion set.

As another implementation, in the embodiment of the present disclosure, the target downlink transmission may also be removed in the process of determining the downlink transmission occasion set corresponding to the semi-static HARQ-ACK codebook, so as to directly acquire the final downlink transmission occasion set; then the corresponding semi-static HARQ-ACK codebook is generated according to the final downlink transmission occasion set. As another implementation, in the embodiment of the present disclosure, the downlink transmission occasion set corresponding to the semi-static HARQ-ACK codebook may be determined firstly, and then a corresponding first semi-static HARQ-ACK codebook is determined according to the downlink transmission occasion set; then the target downlink transmission and a corresponding position thereof in the first semi-static HARQ-ACK codebook are determined, and corresponding feedback information of the target downlink transmission is removed from the first semi-static HARQ-ACK codebook, thereby acquiring the final semi-static HARQ-ACK codebook.

When the target downlink transmission includes the first downlink transmission, the terminal in the embodiment of the present disclosure needs to determine the first downlink transmission prior to sending the semi-static HARQ-ACK codebook. The embodiment of the present disclosure provides multiple determination ways for the first downlink transmission, such as, a downlink transmission that meets a first preset condition is determined as the first downlink transmission; or, a downlink transmission that meets a second preset condition is determined as the first downlink transmission; or, a downlink transmission that meets a first preset condition or a second preset condition is determined as the first downlink transmission (for example, a corresponding judgment is made according to a maximum value among T1 in the first preset condition and T2 in the second preset condition to acquire the first downlink transmission; or judgments are made for the first preset condition and the second preset condition separately, and a downlink transmission that meets any one of the preset conditions is determined as the first downlink transmission); or, a downlink transmission that meets both a first preset condition and a second preset condition is determined as the first downlink transmission (for example, a corresponding judgment is made according to a maximum value among T1 in the first preset condition and T2 in the second preset condition to acquire the first downlink transmission; or judgments are made for the first preset condition and the second preset condition separately, and a downlink transmission that meets both the first and second preset conditions is determined as the first downlink transmission).

The first and second preset conditions will be described below.

1) The first preset condition includes:

a condition that an end symbol of the downlink transmission is later than a first reference symbol, wherein the first reference symbol is a first symbol or a first downlink symbol or a first flexible symbol, which is T1 time before a start position of a start symbol of an uplink channel carrying a HARQ-ACK codebook; or a condition that an end symbol or an end time of the downlink transmission is later than a first reference time, wherein the first reference time is T1 time before a start position of a start symbol of an uplink channel carrying a HARQ-ACK codebook; or a condition that a time interval between an end symbol or an end time of the downlink transmission and a start symbol or a start time of an uplink channel carrying the HARQ-ACK codebook is shorter than T1 time;

wherein, T1 is a predefined value; or, T1 is a value determined based on a configuration; or, T1 is a minimum processing delay of a HARQ-ACK feedback for the downlink transmission.

Here, T1 is calculated according to any of the following formulas:

$$T1=(N_1+d_{1,1})\cdot(2048+144)\cdot\kappa\cdot 2^{-\mu_1}\cdot T_C;$$

$$T1=(N_1+d_{1,1}+1)\cdot(2048+144)\cdot\kappa\cdot 2^{-\mu_1}\cdot T_C$$

In a case that the downlink transmission is a PDSCH scheduled by a PDCCH, $\mu_1$ is an index of a minimum subcarrier spacing among subcarrier spacings corresponding respectively to the PDCCH scheduling the PDSCH, the PDSCH and a PUCCH, or $\mu_1$ is an index of a subcarrier spacing, for obtaining a largest T1 value, among subcarrier spacings corresponding respectively to the PDCCH scheduling the PDSCH, the PDSCH, and a PUCCH;

and/or,

In a case that the downlink transmission is a SPS PDSCH release, $\mu_1$ is an index of a minimum subcarrier spacing among subcarrier spacings corresponding respectively to a PDCCH indicating the SPS PDSCH release and a PUCCH, or $\mu_1$ is an index of a subcarrier spacing, for obtaining a largest T1 value, among subcarrier spacings corresponding respectively to a PDCCH indicating the SPS PDSCH release and a PUCCH; and/or, in a case that the downlink transmission is a SPS PDSCH, $\mu_1$ is an index of a minimum subcarrier spacing among subcarrier spacings corresponding respectively to the SPS PDSCH and a PUCCH, or $\mu_1$ is an index of a subcarrier spacing, for obtaining a largest T1 value, among subcarrier spacings corresponding respectively to the SPS PDSCH and a PUCCH.

Here, if there is only one PUCCH, a sub-carrier spacing corresponding to the PUCCH is a sub-carrier spacing corresponding to this PUCCH. If there are multiple overlapping PUCCHs, subcarrier spacings corresponding to the PUCCH includes a subcarrier spacing corresponding to each overlapping PUCCH, which may also be understood that, a minimum subcarrier spacing or a subcarrier spacing, for obtaining a largest T1 value, is selected from subcarrier spacings corresponding to the multiple overlapping PUCCHs, then a selection is performed between the minimum subcarrier spacing or the subcarrier, for obtaining the largest T1 value spacing, and subcarrier spacings corresponding to other channels.

Here, in a case that the downlink transmission is the SPS PDSCH release, one case is that the same T formula as when the downlink transmission is PDSCH may be reused. At this time, only $d_{1,1}=0$ is agreed for the SPS PDSCH release, so as to achieve the purpose of using a unified T formula. In another case, an independent T formula may be defined for calculation for the SPS PDSCH release. For example, the following formula is acquired by directly removing the $d_{1,1}$ parameter from the above formula:

$$T1=(N_1)\cdot(2048+144)\cdot\kappa\cdot 2^{-\mu_1}\cdot T_C;$$

$$T1=(N_1+1)\cdot(2048+144)\cdot\kappa\cdot 2^{-\mu_1}\cdot T_C;$$

$N_1$ is a value determined based on $\mu_1$ and a terminal capability.

$d_{1,1}$ is a value related to a transmission duration of the downlink transmission, a mapping type and the terminal capability.

$T_c$ is a basic time unit of a New Radio (NR) system (i.e., a sampling time interval).

k is a ratio between a basic time unit of a Long Time Evolution (LTE) system and the basic time unit of the NR system.

2) The second preset condition includes:
  a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying the HARQ-ACK codebook; or
  a condition that an end symbol or an end time of a PDCCH corresponding to the downlink transmission is later than a second reference time, wherein the second reference time is T2 time before a start position of a start symbol of an uplink channel carrying the HARQ-ACK codebook; or
  a condition that a time interval between an end symbol or an end time of a PDCCH corresponding to the downlink transmission and a start symbol or a start time of an uplink channel carrying the HARQ-ACK codebook is shorter than T2 time;
  wherein, T2 is a predefined value; or, T2 is a value determined based on a configuration; or, T2 is a minimum processing delay of a HARQ-ACK of the downlink transmission to be multiplexed with other information for transmission. The above-mentioned other information may be, for example, other uplink control information, uplink data (UL-SCH) carried on the PUSCH, and other information.

Here, if the downlink transmission is the PDSCH, the PDCCH corresponding to the downlink transmission is the PDCCH scheduling the PDSCH, and if the downlink transmission is the SPS PDSCH release, the PDCCH corresponding to the downlink transmission is the PDCCH indicating the SPS PDSCH release.

Here, in a case that the uplink channel carrying the semi-static HARQ-ACK codebook is a PUCCH, T2 is calculated according to any of the following formulas:

$T2 = \max((N_2+1) \cdot (2048+144) \cdot \kappa \cdot 2^{-\mu_2} \cdot T_C, d_{1,2})$ $T2 = (N_2+1) \cdot (2048+144) \cdot \kappa \cdot 2^{-\mu_2} \cdot T_C$ In a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH.

$N_2$ is a value determined based on $\mu_2$ and a terminal capability.

In a case that the PDCCH corresponding to the downlink transmission triggers a Bandwidth Part (BWP) switching, $d_{1,2}$ is time required for the BWP switching, otherwise $d_{1,2}=0$.

$T_c$ is a basic time unit of a New Radio (NR) system.

k is a ratio between a basic time unit of a LTE system and the basic time unit of the NR system.

In a case that the uplink channel carrying the semi-static HARQ-ACK codebook is a PUSCH, T2 is calculated according to any of the following formulas:

$T2 = \max((N_2+1) \cdot (2048+144) \cdot \kappa \cdot 2^{-\mu_3} \cdot T_C, d_{1,2})$ $T2 = (N_2+1) \cdot (2048+144) \cdot \kappa \cdot 2^{-\mu_3} \cdot T_C$ $T2 = \max((N_2+d_{2,1}+1) \cdot (2048+144) \cdot \kappa \cdot 2^{-\mu_4} \cdot T_C, d_{2,2})$ $T2 = \max((N_2+1) \cdot (2048+144) \cdot \kappa \cdot 2^{-\mu_4} \cdot T_C, d_{2,2})$ $T2 = (N_2+d_{2,1}+1) \cdot (2048+144) \cdot \kappa \cdot 2^{-\mu_4} \cdot T_C$ $T2 = \max((Z+d) \cdot (2048+144) \cdot \kappa \cdot 2^{-\mu_5} \cdot T_C, d_{2,2})$ $T2 = (Z+d) \cdot (2048+144) \cdot \kappa \cdot 2^{-\mu_5} \cdot T_C$ $\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH; here, if there is only one PUCCH and PUSCH, sub-carrier spacings corresponding to the PUCCH and the PUSCH is sub-carrier spacings corresponding to this PUCCH and this PUSCH respectively. If there are multiple overlapping PUCCHs and PUSCHs, subcarrier spacings corresponding to the PUCCH and the PUSCH includes a subcarrier spacing corresponding to each overlapping PUCCH and PUSCH, which may also be understood that, a minimum subcarrier spacing or a subcarrier spacing, for obtaining a largest T1 value, is selected from subcarrier spacings corresponding to the multiple overlapping PUCCHs and PUSCHs, then a selection is performed between the minimum subcarrier spacing or the subcarrier, for obtaining the largest T1 value spacing, and subcarrier spacings corresponding to other channels.

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH.

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH, or $\mu_s$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH.

In a case that a first symbol of the PUSCH only includes a Demodulation Reference Signal (DMRS), $d_{2,1}=0$, otherwise $d_{2,1}=1$.

In a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI).

d is a quantity of overlapping symbols between a PDCCH and a scheduled PDSCH.

$T_c$ is a basic time unit of a NR system.

k is a ratio between a basic time unit of a LTE system and the basic time unit of the NR system.

Optionally, in the embodiment of the present disclosure, in a case that the semi-static HARQ-ACK codebook is transmitted on a PUCCH, if there are semi-static HARQ-ACK codebooks for multiple downlink transmissions that need to be transmitted on a same PUCCH simultaneously, resources indicated by a PUCCH resource indication field in multiple PDCCHs for scheduling the multiple downlink transmissions are the same.

The above describes a flow of the method on a terminal side in the embodiment of the present disclosure. The behavior of the network side is further introduced below.

Referring to FIG. 5, an embodiment of the present disclosure provides a method of transmitting a HARQ-ACK codebook, and the method is applied to a base station side and includes Step 501.

Step 501: receiving a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Here, the first downlink transmission includes at least one of a PDSCH scheduled by a PDCCH, a SPS PDSCH, and a SPS PDSCH release; the second downlink transmission includes at least one of a PDSCH scheduled by a PDCCH and a SPS PDSCH release.

Prior to receiving the semi-static HARQ-ACK codebook in Step 501, the base station may also determine a length of the semi-static HARQ-ACK codebook, and then in Step 501, receive the semi-static HARQ-ACK codebook corresponding to the downlink transmission according to the determined length of the semi-static HARQ-ACK codebook.

Through the above step, the base station of the embodiment of the present disclosure may adopt a same quantity of HARQ-ACK transmission bits as the terminal side, and receive the semi-static HARQ-ACK codebook, thereby reducing redundant HARQ-ACK feedback and improving system efficiency and HARQ-ACK transmission performance.

Similar to the terminal side, prior to receiving the semi-static HARQ-ACK codebook, the base station may firstly determine the downlink transmission occasion set corresponding to the semi-static HARQ-ACK codebook, determine the target downlink transmission, and remove the target downlink transmission in the downlink transmission occasion set to acquire a final downlink transmission occasion set; then generate the corresponding semi-static HARQ-ACK codebook according to the downlink transmission occasion set.

As another implementation, in the embodiment of the present disclosure, the target downlink transmission may also be removed in the process of determining the downlink transmission occasion set corresponding to the semi-static HARQ-ACK codebook, so as to directly acquire the final downlink transmission occasion set; then the corresponding semi-static HARQ-ACK codebook is generated according to the final downlink transmission occasion set. As another implementation, in the embodiment of the present disclosure, the downlink transmission occasion set corresponding to the semi-static HARQ-ACK codebook may be determined firstly, and then a corresponding first semi-static HARQ-ACK codebook is determined according to the downlink transmission occasion set; then the target downlink transmission and a corresponding position thereof in the first semi-static HARQ-ACK codebook are determined, and corresponding feedback information of the target downlink transmission is removed from the first semi-static HARQ-ACK codebook, thereby acquiring the final semi-static HARQ-ACK codebook.

Similar to the terminal side, when the target downlink transmission includes the first downlink transmission, the base station in the embodiment of the present disclosure needs to determine the first downlink transmission prior to receiving the semi-static HARQ-ACK codebook. The embodiment of the present disclosure provides multiple determination ways for the first downlink transmission, such as, a downlink transmission that meets a first preset condition is determined as the first downlink transmission; or, a downlink transmission that meets a second preset condition is determined as the first downlink transmission; or, a downlink transmission that meets a first preset condition or a second preset condition is determined as the first downlink transmission; or, a downlink transmission that meets both a first preset condition and a second preset condition is determined as the first downlink transmission.

Regarding the first preset condition and the second preset condition, the above description may be referred to, which will not repeat them here to save space.

Two specific examples will be used to describe below in more detail the behavior of the terminal and the base station in the embodiment of the present disclosure.

Figure 6:
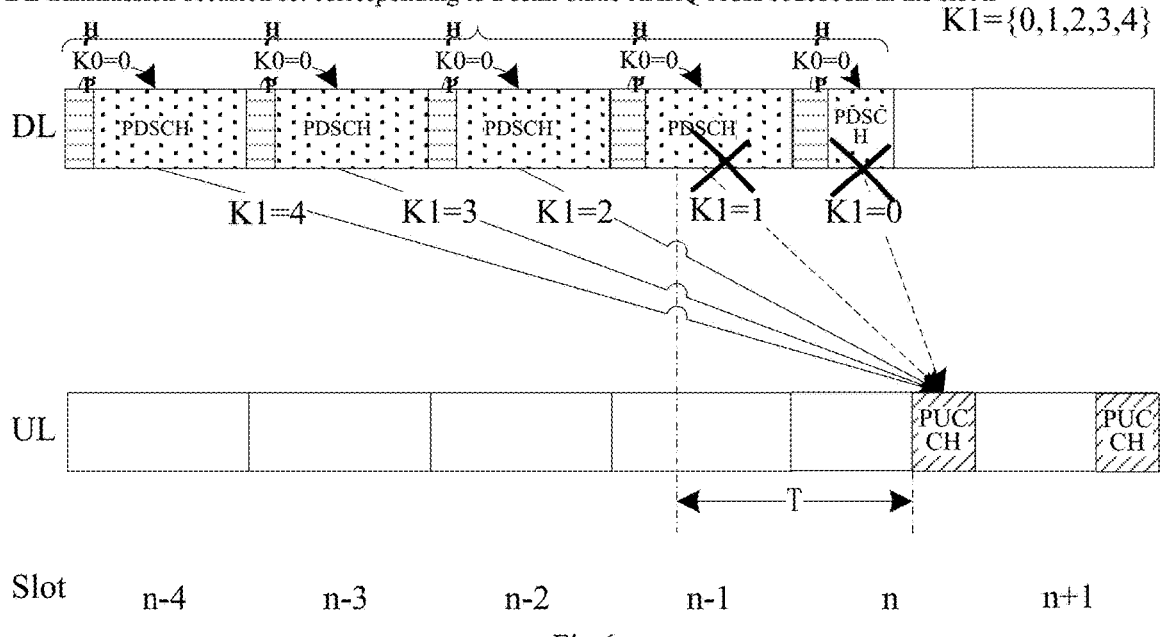
FIG. 6 is an example of a HARQ-ACK feedback provided in an embodiment of the present disclosure.

Example 1: taking a FDD single carrier as an example, there are uplink resources and downlink resources in each slot; for simplicity, assuming that there is only one PDSCH transmission in each slot (there are multiple TDM PDSCHs in a slot, a quantity of PDSCHs in different slots may also be different depending on the UE capability and a configuration of a PDSCH candidate time domain resource set, time domain transmission positions of the PDSCH in each slot in FIG. 6 are only for illustration, and transmission positions in different slots may be the same or different, and may be any one of the PDSCH candidate time domain resource set); it is assumed that there is a PDCCH monitoring occasion in each slot (there may also be multiple PDCCH monitoring occasions in a slot, and there may also be different quantities of PDCCH monitoring occasions in different slots. Time domain transmission positions of the PDCCH monitoring occasion in each slot in FIG. 6 are only for illustration. Transmission positions in different slots may be the same or different depending on a pre-configuration) used to send a PDCCH scheduling a PDSCH or to send a PDCCH indicating a SPS PDSCH release; for simplicity, taking K0=0 as an example, that is, the PDCCH transmitted in a PDCCH monitoring occasion in the slot n schedules a PDSCH to be transmitted in a slot n+K0 (i.e., the slot n), and the PDCCH scheduling the PDSCH also informs a value of K1 used to determine that a slot in which HARQ-ACK feedback information of this PDSCH is transmitted is n+K0+K1; assuming that each PDSCH corresponds to a 1-bit HARQ-ACK (for example, each PDSCH is configured with a single TB transmission), and assuming that the pre-configured K1 set includes five values {0,1,2,3,4}, a way to determine the semi-static HARQ-ACK codebook in the slot n is as follows.

The Terminal Side:

1) According to the K1 set, the PDSCH candidate time domain resource set and a semi-static uplink and downlink resource allocation in the slot (if a semi-static uplink and downlink resource allocation is configured, the allocation is used. If it is not configured, this factor is not considered, and it is considered that each slot may be capable of being scheduled), a PDSCH transmission occasion set M corresponding to the semi-static HARQ-ACK codebook transmitted in the slot n may be determined. That is, there may be one PDSCH transmission in each slot among slots n−4 to n.

2) A PUCCH resource carrying the HARQ-ACK in the slot n is determined according to a PUCCH resource indicator field in multiple PDCCHs scheduling PDSCH to perform the HARQ-ACK feedback in the slot n.

3) A reference point or reference symbol (for example, a first symbol or a first downlink symbol or a first flexible symbol satisfies T time, the terminal and the base station pre-agree one of the determination manners, or predefine one of the determination manners in a protocol) is obtained according to T time before a start position of a first symbol of the PUCCH in the slot n, it is determined that HARQ-ACKs of PDSCHs whose end times (i.e., end positions of last symbols of the PDSCHs) are later than this reference point or reference symbol may not be included in the semi-static HARQ-ACK codebook in the slot n. For example, the reference point or the reference symbol is shown in FIG. 6, it may be determined that HARQ-ACKs of PDSCHs in the slots n−1 and n may not be included in the semi-static HARQ-ACK codebook in the slot n, therefore, candidate PDSCH transmission occasions in these two slots are removed from the M set, and the final M set is acquired. That is, the M set finally used to determine the semi-static HARQ-ACK codebook in the slot n is three PDSCH transmission occasions in slots n−4 to n−2; here, it may also be combined with the first step, that is, the reference point or reference symbol is determined firstly, and then the M is determined according to the description in the first step. In a process of determining the M, transmission occasions that do not meet the reference point or reference symbol are removed directly, so as to acquire the final M set; according to the final M set, it may be determined that a size of the semi-static HARQ-ACK codebook in the slot n is 3 bits, the first bit corresponds to the PDSCH in the slot n−4, the second bit corresponds to the PDSCH in the slot n−3, and the third bit corresponds to the PDSCH in the slot n−2; in another way, firstly, a quantity of elements in the set M determined based on the original K1 is 5, it is determined that the semi-static HARQ-ACK codebook includes 5-bit HARQ-ACK corresponding to PDSCHs in the slots n−4 to n, respectively. Then, based on the reference point or reference symbol acquired by T, it is determined that HARQ-ACKs of PDSCHs whose end positions are later than this reference point or reference symbol may not be included in the semi-static HARQ-ACK codebook in the slot n. Therefore, the last 2 bits are removed from the determined 5-bit semi-static HARQ-ACK codebook, and finally remaining 3-bit HARQ-ACK corresponds to 3 PDSCHs in slots n−4 to n−2, respectively.

4) HARQ-ACK feedback information is sent on the PUCCH according to a 3-bit HARQ-ACK.

The Base Station Side:

1) It is determined in a manner consistent with the above-mentioned terminal side which PDSCH transmission occasions will not be included in the semi-static HARQ-ACK codebook in the slot n.

Therefore, it is determined that the semi-static HARQ-ACK codebook in the slot n actually transmitted by the terminal only includes 3 PDSCHs in the slots n−4 to n−2.

2) HARQ-ACK feedback information is received on the PUCCH according to the 3-bit HARQ-ACK, thereby acquiring the HARQ-ACK feedback information corresponding to the PDSCH.

3) For more reasonable scheduling by the base station, the PDSCH in the slot n−1 is not configured with K1=1, but may be configured with a value of K1 greater than 1, such as K1=2, the PDSCH in the slot n is not configured with K1=0, but may be configured with a value of K1 greater than 0, such as K1=1, then the base station may still perform downlink scheduling in the slots n−1 and n to ensure downlink transmission efficiency. If the base station perform incorrect scheduling, the base station may also configure K1=1 for the PDSCH in the slot n−1 and K1=0 for the PDSCH in the slot n. In this case, if the UE judges that the processing may not be completed, the UE also may not perform HARQ-ACK feedbacks on these PDSCHs in the slot n; therefore, regardless of whether the base station schedules PDSCHs requiring HARQ-ACK feedback in the slot n at these positions, the real HARQ-ACKs of these PDSCHs may not always be included in the semi-static HARQ-ACK codebook in the slot n. Therefore, the semi-static HARQ-ACK codebook in the slot n only needs to be determined according to the PDSCH transmission occasions capable of performing HARQ-ACK feedbacks, and there is no need to make NACK occupancy for those PDSCH transmission opportunities capable of performing a HARQ-ACK feedback, thereby reducing redundant information of the HARQ-ACK transmission, and improving transmission efficiency and performance. At this time, the base station and the terminal determine the reference point or the reference symbol according to the same T and PUCCH starting time, and the acquired semi-static HARQ-ACK codebooks have the same size, and there is no ambiguity in understanding.

Figure 7:
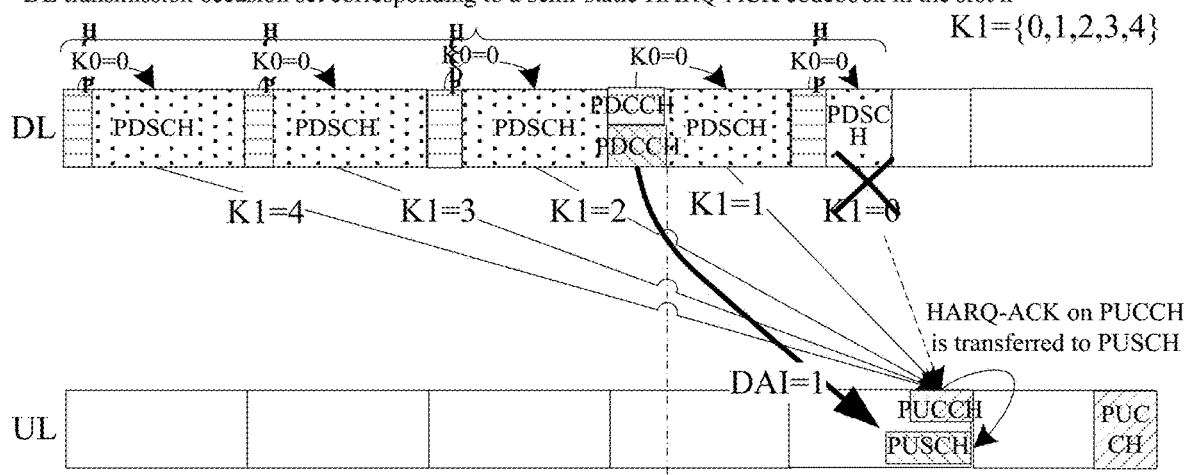
FIG. 7 is another example of a HARQ-ACK feedback provided in an embodiment of the present disclosure.

Example 2: taking a FDD single carrier as an example, there are uplink resources and downlink resources in each slot; for simplicity, assuming that there is one PDSCH transmission in each slot (there are multiple TDM PDSCHs in a slot, a quantity of PDSCHs in different slots may also be different depending on the UE capability and a configuration of a PDSCH candidate time domain resource set, time domain transmission positions of the PDSCH in each slot in FIG. 7 are only for illustration, and transmission positions in different slots may be the same or different, and may be any one of the PDSCH candidate time domain resource set); it is assumed that there is a PDCCH monitoring occasion in each slot (there may also be multiple PDCCH monitoring occasions in a slot, and there may also be different quantities of PDCCH monitoring occasions in different slots. Time domain transmission positions of the PDCCH monitoring occasion in each slot in FIG. 7 are only for illustration. Transmission positions in different slots may be the same or different depending on a pre-configuration) used to send a PDCCH scheduling a PDSCH or to send a PDCCH indicating a SPS PDSCH release; for simplicity, taking K0=0 as an example, that is, the PDCCH transmitted in a PDCCH monitoring occasion in the slot n schedules a PDSCH to be transmitted in a slot n+K0 (i.e., the slot n), and the PDCCH scheduling the PDSCH also informs a value of K1 used to determine that a slot in which HARQ-ACK feedback information of this PDSCH is transmitted is n+K0+K1; assuming that each PDSCH corresponds to a 1-bit HARQ-ACK (for example, each PDSCH is configured with a single TB transmission), assuming that the pre-configured K1 set includes five values {0,1,2,3,4}; assuming that a PDCCH is sent in the slot n−1 to schedule PUSCH transmission in the slot n, wherein K2=1 is a PUSCH scheduling timing, which means that the PDCCH in the slot n−1 schedules the PUSCH transmission in the slot n−1+K2, a way to determine the semi-static HARQ-ACK codebook in the slot n is as follows.

The Terminal Side:

1) According to the K1 set, the PDSCH candidate time domain resource set and a semi-static uplink and downlink resource allocation in the slot (if a semi-static uplink and downlink resource allocation is configured, the allocation is used. If it is not configured, this factor is not considered, and it is considered that each slot may be capable of being scheduled), a PDSCH transmission occasion set M corresponding to the semi-static HARQ-ACK codebook transmitted in the slot n may be determined. That is, there may be one PDSCH transmission in each slot among slots n−4 to n.

2) A PUCCH resource carrying the HARQ-ACK in the slot n is determined according to a PUCCH resource indicator field in multiple PDCCHs scheduling PDSCH to perform the HARQ-ACK feedback in the slot n.

3) Assuming that it is determined that the PUCCH and the PUSCH in the slot n have resource overlap in a time domain, it is determined that the HARQ-ACK transmitted on the PUCCH in the slot n needs to be transferred to the PUSCH for transmission instead of the PUCCH.

4) A quantity of bits of the HARQ-ACK for a final transmission is determined.

Scheme a: As shown in FIG. 7, it is determined to remove a downlink transmission scheduled by a PDCCH transmitted in a PDCCH monitoring occasion after a UL grant (a PDCCH scheduling a PUSCH) included in the above M set from the M set. That is, since the PDSCH in the slot n is scheduled by the PDCCH transmitted in the PDCCH monitoring occasion after the UL grant, the PDSCH in the slot n is not included, and the final M set is acquired. That is, a HARQ-ACK corresponding to the PDSCH in the slot n may not be included in the semi-static HARQ-ACK codebook in the slot n. Or it can be directly combined with the first step here, it may be directly combined with the first step here, that is, in a process of determining the M set, it is also considered that the M set does not include the downlink transmission scheduled by the PDCCH transmitted in the PDCCH monitoring occasion after the UL grant (PDCCH scheduling PUSCH), so as to acquire the final M set; according to the final M set, it may be determined that a size of the semi-static HARQ-ACK codebook in the slot n is 4 bits, the first bit corresponds to the PDSCH in the slot n−4, and the second bit corresponds to the PDSCH in the slot n−3, the third bit corresponds to the PDSCH in the slot n−2, and the fourth bit corresponds to the PDSCH in the slot n−1; in another way, firstly, a quantity of elements in the set M determined based on the original K1 is 5, it is determined that the semi-static HARQ-ACK codebook includes 5-bit HARQ-ACK corresponding to PDSCHs in the slots n−4 to n, respectively. Then the downlink transmission scheduled by the PDCCH transmitted in the PDCCH monitoring occasion after the UL grant is removed, therefore, the last 1 bit is removed from the determined 5-bit semi-static HARQ-ACK codebook, and finally the remaining 4-bit HARQ-ACK is corresponding to 4 PDSCHs in the slots n−4 to n−1, respectively.

Figure 8:
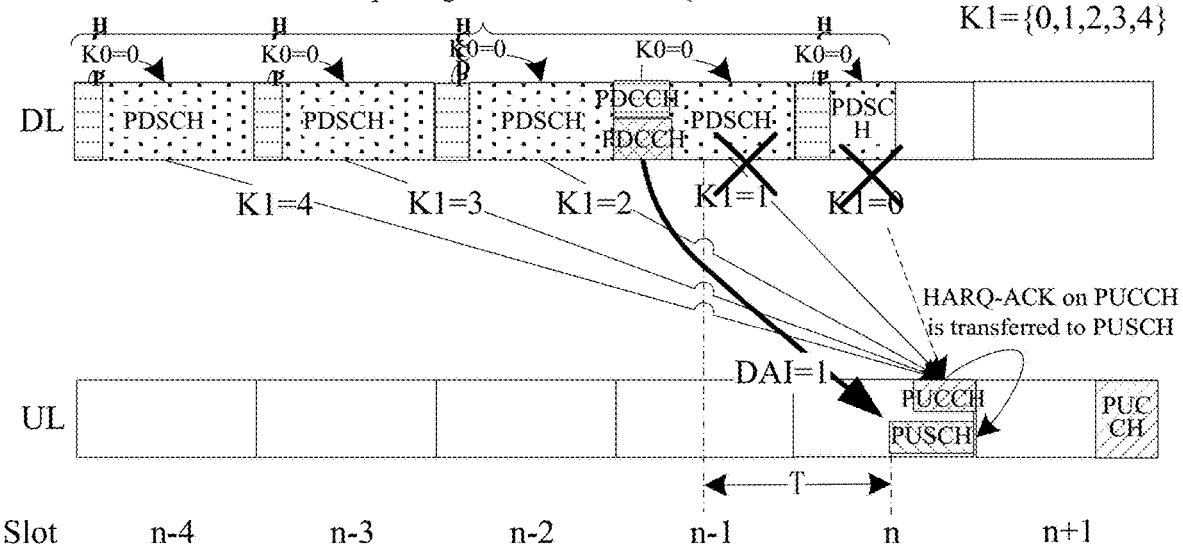
FIG. 8 is still another example of a HARQ-ACK feedback provided in an embodiment of the present disclosure.

Scheme B: as shown in FIG. 8, a reference point or reference symbol (for example, a first symbol or a first downlink symbol or a first flexible symbol satisfies T time, the terminal and the base station pre-agree one of the determination manners, or predefine one of the determination manners in a protocol) is found according to T time before a start position of a first symbol of the PUSCH (according to T time before a start position of a first symbol of the PUCCH, if agreed) in the slot n, it is determined that HARQ-ACKs of PDSCHs whose end times (i.e., end positions of last symbols of the PDSCHs) are later than this reference point or reference symbol may not be included in the semi-static HARQ-ACK codebook in the slot n. For example, the reference point or the reference symbol is shown in FIG. 8, it may be determined that HARQ-ACKs of PDSCHs in the slots n−1 and n may not be included in the semi-static HARQ-ACK codebook in the slot n, therefore, candidate PDSCH transmission occasions in these slots are removed from the M set, and the final M set is acquired. That is, the M set finally used to determine the semi-static HARQ-ACK codebook in the slot n is three PDSCH transmission occasions in slots n−4 to n−2; here, it may also be combined with the first step, that is, the reference point or reference symbol is determined firstly, and then the M is determined according to the description in the first step. In a process of determining the M, transmission occasions that do not meet the reference point or reference symbol are removed directly, so as to acquire the final M set; according to the final M set, it may be determined that a size of the semi-static HARQ-ACK codebook in the slot n is 3 bits, the first bit corresponds to the PDSCH in the slot n−4, the second bit corresponds to the PDSCH in the slot n−3, and the third bit corresponds to the PDSCH in the slot n−2; in another way, firstly, a quantity of elements in the set M determined based on the original K1 is 5, it is determined that the semi-static HARQ-ACK codebook includes 5-bit HARQ-ACK corresponding to PDSCHs in the slots n−4 to n, respectively. Then, based on the reference point or the reference symbol acquired by T, it is determined that HARQ-ACKs of PDSCHs whose end positions are later than this reference point or reference symbol may not be included in the semi-static HARQ-ACK codebook in the slot n. Therefore, the last 2 bits are removed from the determined 5-bit semi-static HARQ-ACK codebook, and finally remaining 3-bit HARQ-ACK corresponds to 3 PDSCHs in slots n−4 to n−2, respectively.

Figure 9:
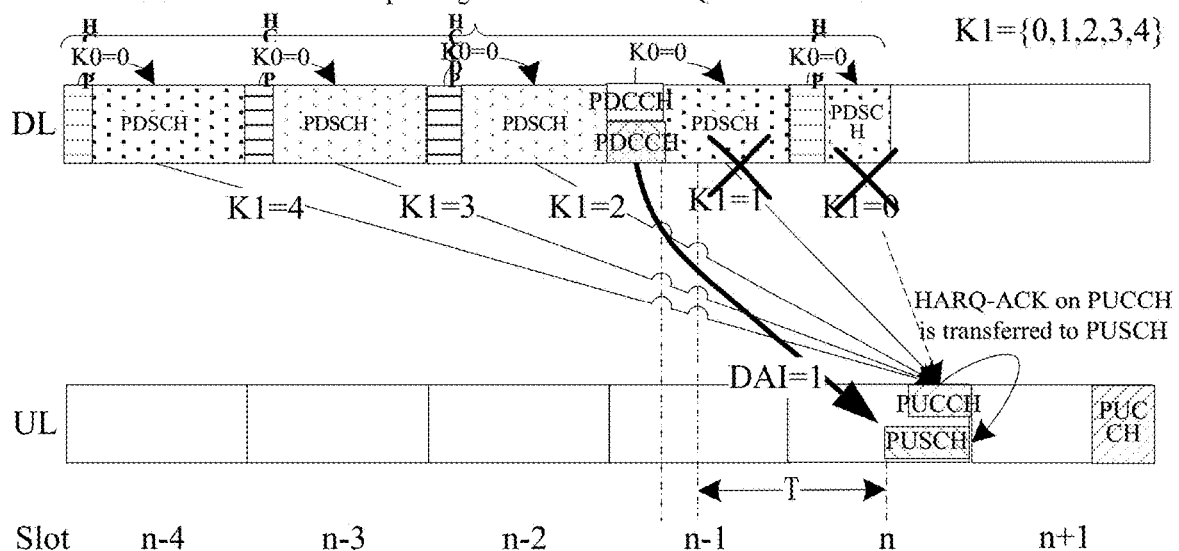
FIG. 9 is yet another example of a HARQ-ACK feedback provided in an embodiment of the present disclosure.

Scheme c: the quantity of bits of the HARQ-ACK for the final transmission is determine based on T and UL grant simultaneously. As shown in FIG. 9, it is equivalent to a removed union of the above-mentioned PDSCHs that may not be included and may be determined in accordance with manner 1 and manner 2. Therefore, the final M set only includes the PDSCHs in the slots n−4 to n−2, and the 3-bit HARQ-ACK is finally transmitted.

5) The HARQ-ACK feedback information is sent on the PUSCH according to the HARQ-ACK with the final quantity of bits determined above.

The Base Station Side:

1) It is determined in a manner consistent with the above-mentioned terminal side which PDSCH transmission occasions will not be included in the semi-static HARQ-ACK codebook in the slot n. Therefore, it is determined that the semi-static HARQ-ACK codebook in the slot n actually transmitted by the terminal only includes 3 PDSCHs in the slots n−4 to n−2;

2) HARQ-ACK feedback information is received on the PUSCH according to the 3-bit HARQ-ACK, thereby acquiring the HARQ-ACK feedback information corresponding to the PDSCH.

Here, for more reasonable scheduling by the base station, for example, the PDSCH in the slot n is not configured with K1=0, but may be configured with a value of K1 greater than 0, such as K1=1, then the base station may still perform downlink scheduling in the slot n to ensure downlink transmission efficiency. If the base station perform incorrect scheduling, the base station may also configure K1=0 for the PDSCH in the slot n. In this case, the UE judges that these downlink transmissions occurred after the UL grant, since the DAI in the UL grant may not include these transmissions, the UE also may not perform HARQ-ACK feedbacks on these PDSCHs in the slot n; therefore, regardless of whether the base station schedules PDSCHs requiring HARQ-ACK feedback in the slot n at these positions, the real HARQ-ACKs of these PDSCHs may not always be included in the semi-static HARQ-ACK codebook in the slot n. Therefore, the semi-static HARQ-ACK codebook in the slot n only needs to be determined according to the PDSCH transmission occasions capable of performing HARQ-ACK feedbacks, and there is no need to make NACK occupancy for those PDSCH transmission opportunities capable of performing a HARQ-ACK feedback, thereby reducing redundant information of the HARQ-ACK transmission, and improving transmission efficiency and performance. In this case, both the base station and the terminal determine which downlink transmissions may not be included in the semi-static HARQ-ACK codebook according to the same rule (for example, both according to an UL grant, or both according to T, or both considering UL grant and T simultaneously). The size of the semi-static HARQ-ACK codebook is the same, and there is no ambiguity in understanding.

It should be noted that, in the above example, replacing all or any of the above PDSCHs with SPS PDSCH releases (that is, PDCCHs indicating release of SPS resources) is also applicable. The difference is that the SPS PDSCH release itself is a PDCCH, which needs to be transmitted in a PDCCH monitoring occasion in each slot, and no other PDCCH is needed to schedule this transmission. It is also applicable to replace all or any of the above-mentioned PDSCHs with SPS PDSCHs. In the above example, only FDD is used as an example, and TDD is also applicable, the only difference is that there may not be downlink symbols available for a PDSCH transmission or a SPS PDSCH release transmission in each slot. Therefore, transmission occasions determined in the M set are not necessarily in consecutive slots. Since there are no downlink transmission resources in some slots or the downlink transmission resources are insufficient to support candidate PDSCH time domain resources, thus these slot may be excluded. In the above example, if there are multiple carrier aggregations, each carrier determines its corresponding M set according to a PDSCH candidate time domain resource set corresponding to the carrier, the K1 set and a slot structure of the carrier (if configured), other methods are the same as above. After a HARQ-ACK codebook corresponding to each carrier is acquired, HARQ-ACK codebooks of multiple carriers are cascaded together according to the index of carrier in an ascending order to form a HARQ-ACK codebook finally transmitted on the PUCCH.

In the above example 1, only the PUCCH carrying the HARQ-ACK in the slot n, that does not conflict with other PUCCHs, is taken as an example, if the PUCCH carrying the HARQ-ACK and other PUCCHs (such as PUCCHs carrying CSI and/or a Scheduling Request (SR)) overlap in the time domain, the above process is also applicable. The possible difference is that the T value may change. For example, when the PUCCH carrying the HARQ-ACK does not conflict with other PUCCHs, T is calculated according to the following formula in the first preset condition:

$$T=(N_1+d_{1,1})\cdot(2048+144)\cdot\kappa\cdot 2^{-\mu_1}\cdot T_C;$$

In a case that the PUCCH carrying the HARQ-ACK conflicts with other PUCCHs, T is calculated according to the following formula in the first preset condition: $T=(N_1+d_{1,1}+1)\cdot(2048+144)\cdot\kappa\cdot 2^{-\mu_1}\cdot T_C$, or according to $T=\max((N_2+1)\cdot(2048+144)\cdot\kappa\cdot 2^{-\mu_2}\cdot T_C, d_{1,2})$ or $T=(N_2+1)\cdot(2048+144)\cdot\kappa\cdot 2^{-\mu_2}\cdot T_C$ in the second preset condition, or T satisfies any one of the first preset condition or the second preset condition, such as T is defined as a maximum value among T1 and T2, that is T=max (T1, T2), for example, $T1=(N_1+d_{1,1})\cdot(2048+144)\cdot\kappa\cdot 2^{-\mu_1}\cdot T_C$ 和 $T2=(N_2+1)\cdot(2048+144)\cdot\kappa\cdot 2^{-\mu_2}\cdot T_C$, then T may be $T=\max((N_1+d_{1,1})\cdot(2048+144)\cdot\kappa\cdot 2^{-\mu_1}\cdot T_C, (N_2+1)\cdot(2048+144)\cdot\kappa\cdot 2^{-\mu_2}\cdot T_C)$, or T satisfies both the first preset condition and the second preset condition, such as T is defined as a minimum value among T1 and T2, that is T=min (T1, T2), for example, $T1=(N_1+d_{1,1})\cdot(2048+144)\cdot\kappa\cdot 2^{-\mu_1}\cdot T_C$ 和 $T2=(N_2+1)\cdot(2048+144)\cdot\kappa\cdot 2^{-\mu_2}\cdot T_C$, then T may be $T=\min((N_1+d_{1,1})\cdot(2048+144)\cdot\kappa\cdot 2^{-\mu_1}\cdot T_C, (N_2+1)\cdot(2048+144)\cdot\kappa\cdot 2^{-\mu_2}\cdot T_C)$.

In the above example 2, if the PUSCH in the slot n is a PUSCH that does not carry A-CSI, the T value may be the T1 value in the first preset condition, for example $T=(N_1+d_{1,1})\cdot(2048+144)\cdot\kappa\cdot 2^{-\mu_4}\cdot T_C$ or $T=(N_1+d_{1,1}+1)\cdot(2048+144)\cdot\kappa\cdot 2^{-\mu_4}\cdot T_C$; T may also be the T2 value in the second preset condition, such as, $$T=\max((N_2+1)\cdot(2048+144)\cdot\kappa\cdot 2^{-\mu_3}\cdot T_C, d_{1,2})$$

$$T=(N_2+1)\cdot(2048+144)\cdot\kappa\cdot 2^{-\mu_3}\cdot T_C$$

$$T=\max((N_2+d_{2,1}+1)\cdot(2048+144)\cdot\kappa\cdot 2^{-\mu_4}\cdot T_C, d_{2,2})$$

$$T=\max((N_2+1)\cdot(2048+144)\cdot\kappa\cdot 2^{-\mu_4}\cdot T_C, d_{2,2})$$

$$T=(N_2+d_{2,1}+1)\cdot(2048+144)\cdot\kappa\cdot 2^{-\mu_4}\cdot T_C$$

T may also be a maximum or minimum value among T1 in the first preset condition and T2 in the second preset condition, for example T=max (T1, T2), for example $T1=(N_1+d_{1,1}+1)\cdot(2048+144)\cdot\kappa\cdot 2^{-\mu_1}\cdot T_C$, $T2=(N_2+1)\cdot(2048+144)\cdot\kappa\cdot 2^{-\mu_1}\cdot T_C$, then T may be $T=\max((N_1+d_{1,1}+1)\cdot(2048+144)\cdot\kappa\cdot 2^{-\mu_1}\cdot T_C, (N_2+1)\cdot(2048+144)\cdot\kappa\cdot 2^{-\mu_3}\cdot T_C)$, for example T=min (T1, T2), for example $T1=(N_1+d_{1,1}+1)\cdot(2048+144)\cdot\kappa\cdot 2^{-\mu_1}\cdot T_C$, $T2=(N_2+1)\cdot(2048+144)\cdot\kappa\cdot 2^{-\mu_1}\cdot T_C$, then T may be $T=\min((N_1+d_{1,1}+1)\cdot(2048+144)\cdot\kappa\cdot 2^{-\mu_1}\cdot T_C, (N_2+1)\cdot(2048+144)\cdot\kappa\cdot 2^{-\mu_3}\cdot T_C)$.

In a case that the PUSCH in the slot n is the PUSCH carrying A-CSI, the T value may be the T1 value in the first preset condition, and the details are the same as above; T may also be the T2 value in the second preset condition, such as: $T=\max((Z+d)\cdot(2048+144)\cdot\kappa\cdot 2^{-\mu_5}\cdot T_C, d_{2,2})$ or $T=(Z+d)\cdot(2048+144)\cdot\kappa\cdot 2^{-\mu_5}\cdot T_C$; T may also be a maximum or minimum value among T1 in the first preset condition and T2 in the second preset condition, and the details are similar to the above, and will not be repeated.

The above definition of the T value is only an example, and other definitions of the T value are not excluded, such as the formula for the T value acquired by other combinations of various time parameters mentioned above.

In the foregoing embodiment, when the semi-static HARQ-ACK codebook is transmitted on the PUCCH and the PUSCH, the same or different manners described above may be used for judgment.

In a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

Based on the above method, embodiments of the present disclosure further provide devices for implementing the above methods.

Figure 10:
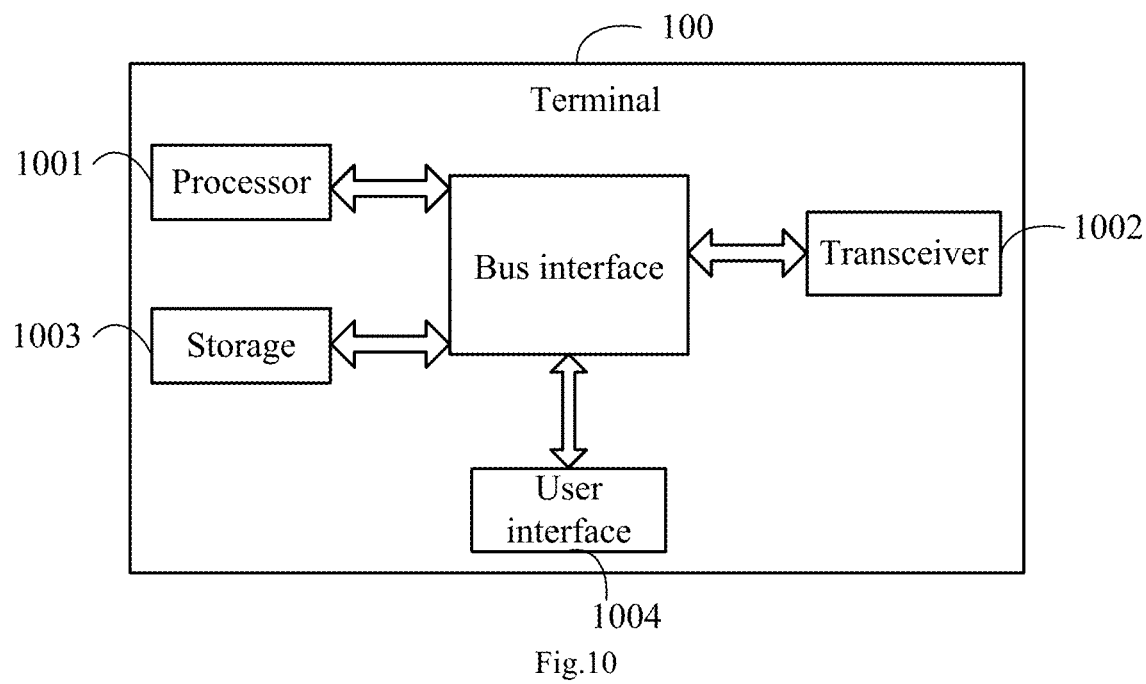
FIG. 10 is a schematic structural diagram illustrating a terminal provided in an embodiment of the present disclosure.

Referring to FIG. 10, a schematic structural diagram of a terminal provided in an embodiment of the present disclosure is illustrated, a terminal 100 includes: a processor 1001, a transceiver 1002, a storage 1003, a user interface 1004 and a bus interface.

In an embodiment of the present disclosure, the terminal 1000 further includes: a computer program stored on the storage 1003 and executable by the processor 1001.

The transceiver 1002 is configured to send a semi-static HARQ-ACK codebook, wherein the semi-static HARQ-ACK codebook does not include HARQ-ACK feedback information corresponding to a target downlink transmission, the target downlink transmission includes at least one of the following transmissions:
  a first downlink transmission that does not meet a processing delay requirement;
  a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Here, the first downlink transmission includes at least one of a PDSCH scheduled by a PDCCH, a SPS PDSCH, and a SPS PDSCH release.

The second downlink transmission includes at least one of a PDSCH scheduled by a PDCCH and a SPS PDSCH release.

In FIG. 10, a bus architecture may include any number of interconnected buses and bridges. Various circuits, specifically, one or more processors represented by the processor 1001 and a storage represented by the storage 1003, are linked together. The bus architecture may also link various other circuits such as peripherals, voltage regulators and power management circuits, which are well known in the art, and therefore a further description is omitted herein. The bus interface provides interfaces. The transceiver 1002 may be a plurality of elements, that is, includes a transmitter and a receiver, to provide units configured to communicate with various other devices over a transmission medium. For different user devices, the user interface 1004 can also be an interface capable of externally/internally connecting the required devices which including but not limited to a keypad, a display, a speaker, a microphone, a joystick, and the like.

The processor 1001 is responsible for managing the bus architecture and general processing, and the storage 1003 can store data used by the processor 1001 when performing operations.

Here, the processor 1001 is configured to read the program in the storage to implement the following process: in a case that the semi-static HARQ-ACK codebook does not include HARQ-ACK feedback information corresponding to the first downlink transmission, prior to sending a semi-static HARQ-ACK codebook corresponding to the downlink transmission, the first downlink transmission is further determined as follows:
  determining a downlink transmission that meets a first preset condition as the first downlink transmission; or,
  determining a downlink transmission that meets a second preset condition as the first downlink transmission; or,
  determining a downlink transmission that meets a first preset condition or a second preset condition as the first downlink transmission; or,
  determining a downlink transmission that meets both a first preset condition and a second preset condition as the first downlink transmission.

Optionally, the first preset condition includes:
  a condition that an end symbol of the downlink transmission is later than a first reference symbol, wherein the first reference symbol is a first symbol or a first downlink symbol or a first flexible symbol, which is T1 time before a start position of a start symbol of an uplink channel carrying a HARQ-ACK codebook; or
  a condition that an end symbol or an end time of the downlink transmission is later than a first reference time, wherein the first reference time is T1 time before a start position of a start symbol of an uplink channel carrying the HARQ-ACK codebook; or
  a condition that a time interval between an end symbol or an end time of the downlink transmission and a start symbol or a start time of an uplink channel carrying the HARQ-ACK codebook is shorter than T1 time;
  wherein, T1 is a predefined value; or, T1 is a value determined based on a configuration; or, T1 is a minimum processing delay of a HARQ-ACK feedback for the downlink transmission.

Here, T1 is calculated according to any of the following formulas:

$$T1=(N_1+d_{1,1})\cdot(2048+144)\cdot\kappa\cdot 2^{-\mu_1}\cdot T_C;$$

$$T1=(N_1+d_{1,1}+1)\cdot(2048+144)\cdot\kappa\cdot 2^{-\mu_1}\cdot T_C$$

In a case that the downlink transmission is a PDSCH scheduled by a PDCCH, $\mu_1$ is an index of a minimum subcarrier spacing among subcarrier spacings corresponding respectively to the PDCCH scheduling the PDSCH, the PDSCH and a PUCCH, or $\mu_1$ is an index of a subcarrier spacing, for obtaining a largest T1 value, among subcarrier spacings corresponding respectively to the PDCCH scheduling the PDSCH, the PDSCH, and a PUCCH; and/or, in a case that the downlink transmission is a SPS PDSCH release, $\mu_1$ is an index of a minimum subcarrier spacing among subcarrier spacings corresponding respectively to a PDCCH indicating the SPS PDSCH release and a PUCCH, or $\mu_1$ is an index of a subcarrier spacing, for obtaining a largest T1 value, among subcarrier spacings corresponding respectively to a PDCCH indicating the SPS PDSCH release and a PUCCH; and/or, in a case that the downlink transmission is a SPS PDSCH, $\mu_1$ is an index of a minimum subcarrier spacing among subcarrier spacings corresponding respectively to the SPS PDSCH and a PUCCH, or $\mu_1$ is an index of a subcarrier spacing, for obtaining a largest T1 value, among subcarrier spacings corresponding respectively to the SPS PDSCH and a PUCCH.

$N_1$ is a value determined based on $\mu_1$ and a terminal capability.

$d_{1,1}$ is a value related to a transmission duration of the downlink transmission, a mapping type and the terminal capability.

$T_c$ is a basic time unit of a NR system.

k is a ratio between a basic time unit of a LTE system and the basic time unit of the NR system.

Optionally, the second preset condition includes:

a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying the HARQ-ACK codebook; or a condition that an end symbol or an end time of a PDCCH corresponding to the downlink transmission is later than a second reference time, wherein the second reference time is T2 time before a start position of a start symbol of an uplink channel carrying the HARQ-ACK codebook; or a condition that a time interval between an end symbol or an end time of a PDCCH corresponding to the downlink transmission and a start symbol or a start time of an uplink channel carrying the HARQ-ACK codebook is shorter than T2 time;

wherein, T2 is a predefined value; or, T2 is a value determined based on a configuration; or, T2 is a minimum processing delay of a HARQ-ACK of the downlink transmission to be multiplexed with other information for transmission.

Here, in a case that the uplink channel carrying the semi-static HARQ-ACK codebook is a PUCCH, T2 is calculated according to any of the following formulas:

$$T2=\max((N_2+1)\cdot(2048+144)\cdot\kappa\cdot2^{-\mu_2}\cdot T_C, d_{1,2})$$

$$T2=(N_2+1)\cdot(2048+144)\cdot\kappa\cdot2^{-\mu_2}\cdot T_C$$

In a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH.

$N_2$ is a value determined based on $\mu_2$ and a terminal capability.

In a case that the PDCCH corresponding to the downlink transmission triggers a Bandwidth Part (BWP) switching, $d_{1,2}$ is time required for the BWP switching, otherwise $d_{1,2}=0$.

$T_c$ is a basic time unit of a NR system.

k is a ratio between a basic time unit of a LTE system and the basic time unit of the NR system.

Here, in a case that the uplink channel carrying the semi-static HARQ-ACK codebook is a PUSCH, T2 is calculated according to any of the following formulas:

$$T2=\max((N_2+1)\cdot(2048+144)\cdot\kappa\cdot2^{-\mu_3}\cdot T_C, d_{1,2})$$

$$T2=(N_2+1)\cdot(2048+144)\cdot\kappa\cdot2^{-\mu_3}\cdot T_C$$

$$T2=\max((N_2+d_{2,1}+1)\cdot(2048+144)\cdot\kappa\cdot2^{-\mu_4}\cdot T_C, d_{2,2})$$

$$T2=\max((N_2+1)\cdot(2048+144)\cdot\kappa\cdot2^{-\mu_4}\cdot T_C, d_{2,2})$$

$$T2=(N_2+d_{2,1}+1)\cdot(2048+144)\cdot\kappa\cdot2^{-\mu_4}\cdot T_C$$

$$T2=\max((Z+d)\cdot(2048+144)\cdot\kappa\cdot2^{-\mu_5}\cdot T_C, d_{2,2})$$

$$T2=(Z+d)\cdot(2048+144)\cdot\kappa\cdot2^{-\mu_5}\cdot T_C$$

$\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH.

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH.

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH, or $\mu_5$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH.

In a case that a first symbol of the PUSCH only includes a Demodulation Reference Signal (DMRS), $d_{2,1}=0$, otherwise $d_{2,1}=1$.

In a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI).

d is a quantity of overlapping symbols between a PDCCH and a scheduled PDSCH.

$T_c$ is a basic time unit of a NR system.

k is a ratio between a basic time unit of a LTE system and the basic time unit of the NR system.

Here, in a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

Figure 11:
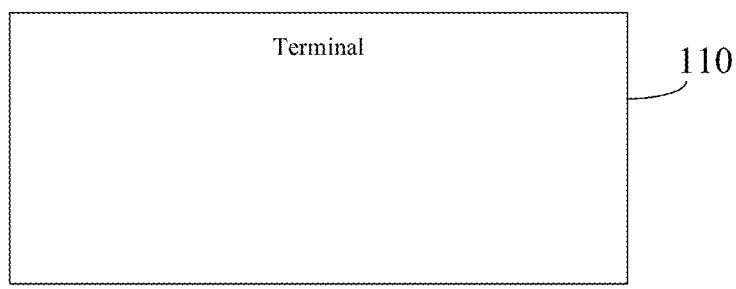
FIG. 11 is another schematic structural diagram illustrating a terminal provided in an embodiment of the present disclosure.

Referring to FIG. 11, an embodiment of the present disclosure provides another terminal 110, the terminal includes: a sending unit 111, configured to send a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Optionally, the terminal may further include: a determination unit, configured to determine, in a case that the semi-static HARQ-ACK codebook does not include HARQ-ACK feedback information corresponding to the first downlink transmission, the first downlink transmission as follows:

determining a downlink transmission that meets a first preset condition as the first downlink transmission; or, determining a downlink transmission that meets a second preset condition as the first downlink transmission; or, determining a downlink transmission that meets a first preset condition or a second preset condition as the first downlink transmission; or, determining a downlink transmission that meets both a first preset condition and a second preset condition as the first downlink transmission.

Optionally, in a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

Regarding description of the above-mentioned first and second preset conditions, the above description may be referred to, which will not be repeated here.

Figure 12:
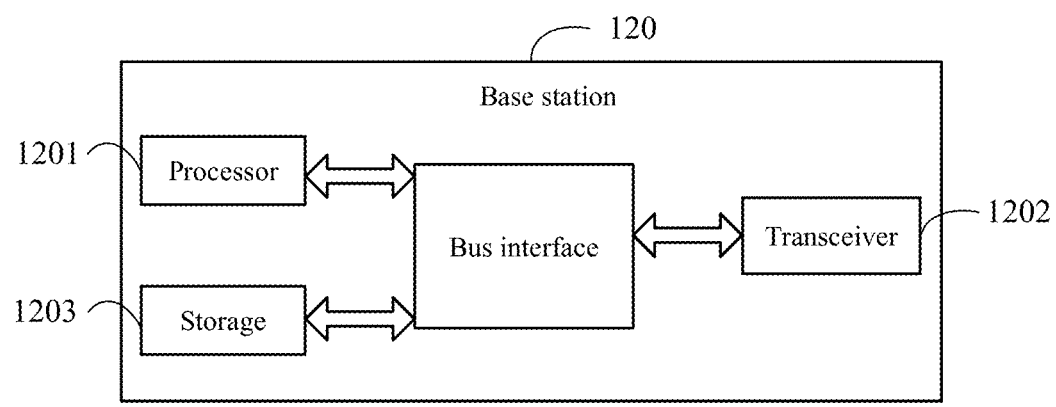
FIG. 12 is a schematic structural diagram illustrating a base station provided in an embodiment of the present disclosure.

Referring to FIG. 12, a schematic structural diagram of a base station 1200 provided in an embodiment of the present disclosure is illustrated, and the base station includes: a processor 1201, a transceiver 1202, a storage 1203 and a bus interface.

In an embodiment of the present disclosure, the base station 1200 further includes: a computer program stored on the storage 1203 and executable by the processor 1201.

The transceiver 1202 is configured to receive a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Here, the first downlink transmission includes at least one of a PDSCH scheduled by a PDCCH, a SPS PDSCH, and a SPS PDSCH release.

The second downlink transmission includes at least one of a PDSCH scheduled by a PDCCH and a SPS PDSCH release.

In FIG. 12, a bus architecture may include any number of interconnected buses and bridges. Various circuits, specifically, one or more processors represented by the processor 1201 and a storage represented by the storage 1203, are linked together. The bus architecture may also link various other circuits such as peripherals, voltage regulators and power management circuits, which are well known in the art, and therefore a further description is omitted herein. The bus interface provides interfaces. The transceiver 1202 may be a plurality of elements, that is, includes a transmitter and a receiver, to provide units configured to communicate with various other devices over a transmission medium.

The processor 1201 is responsible for managing the bus architecture and general processing, and the storage 1203 may store data used by the processor 1201 when performing operations.

Optionally, the processor 1201 is configured to read the program in the storage to implement the following process: prior to receiving the semi-static HARQ-ACK codebook, determining a length of the semi-static HARQ-ACK codebook.

Optionally, the processor 1201 is further configured to determine, in a case that the semi-static HARQ-ACK codebook does not include HARQ-ACK feedback information corresponding to the first downlink transmission, the first downlink transmission as follows:

determining a downlink transmission that meets a first preset condition as the first downlink transmission; or, determining a downlink transmission that meets a second preset condition as the first downlink transmission; or, determining a downlink transmission that meets a first preset condition or a second preset condition as the first downlink transmission; or, determining a downlink transmission that meets both a first preset condition and a second preset condition as the first downlink transmission.

Optionally, the processor 1201 is further configured to indicate, in a case that the semi-static HARQ-ACK codebook is transmitted on a PUCCH, if there are semi-static HARQ-ACK codebooks for multiple downlink transmissions that need to be transmitted on a same PUCCH simultaneously, a same PUCCH resource in a PUCCH resource indication field of the PDCCH for scheduling the multiple downlink transmissions.

Regarding description of the above-mentioned first and second preset conditions, the above description may be referred to, which will not be repeated here.

Figure 13:
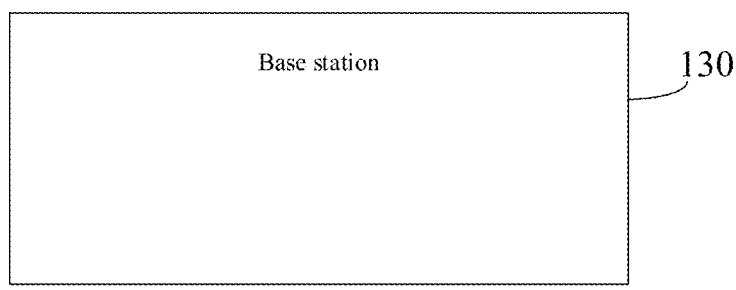
FIG. 13 is another schematic structural diagram illustrating a base station provided in an embodiment of the present disclosure.

Referring to FIG. 13, an embodiment of the present disclosure provides another structure of a base station 130. As shown in FIG. 13, the base station 130 includes: a reception unit 131, configured to receive a semi-static HARQ-ACK codebook, wherein the semi-static HARQ-ACK codebook does not include HARQ-ACK feedback information corresponding to a target downlink transmission, the target downlink transmission includes at least one of the following transmissions:

a first downlink transmission that does not meet a processing delay requirement;
a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

Optionally, the base station further includes: a determination unit, configured to determine, prior to receiving the semi-static HARQ-ACK codebook corresponding to the downlink transmission, a length of the semi-static HARQ-ACK codebook.

Specifically, the determination unit is further configured to determine, in a case that the semi-static HARQ-ACK codebook does not include HARQ-ACK feedback information corresponding to the first downlink transmission, the first downlink transmission as follows:

determining a downlink transmission that meets a first preset condition as the first downlink transmission; or,
determining a downlink transmission that meets a second preset condition as the first downlink transmission; or,
determining a downlink transmission that meets a first preset condition or a second preset condition as the first downlink transmission; or,
determining a downlink transmission that meets both a first preset condition and a second preset condition as the first downlink transmission.

Regarding description of the above-mentioned first and second preset conditions, the above description may be referred to, which will not be repeated here.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. A part or all of the units may be selected according to actual needs to achieve the objectives of the solutions of the embodiments of the present disclosure.

In addition, each functional unit in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the method of transmitting a hybrid automatic retransmission request acknowledgment codebook according to the respective embodiments of the present disclosure. The foregoing storage medium includes various media that may store program codes, such as a USB flash drive, a mobile hard disk, a ROM, a RAM, a magnetic disk, or an optical disk.

The aforementioned are merely specific implementations of the present disclosure, but the scope of the disclosure is by no means limited thereto. Any modifications or substitutions that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A method of transmitting a hybrid automatic retransmission request acknowledgment (HARQ-ACK) codebook, applied to a terminal, comprising:
   sending a semi-static HARQ-ACK codebook, wherein the semi-static HARQ-ACK codebook does not comprise HARQ-ACK feedback information corresponding to a target downlink transmission, the target downlink transmission comprises at least one of the following transmissions:
   a first downlink transmission that does not meet a processing delay requirement;
   a second downlink transmission corresponding to a second Physical Downlink Control Channel (PDCCH) which is transmitted after a first PDCCH, wherein the semi-static HARQ-ACK codebook is transmitted on a Physical Uplink Shared Channel (PUSCH) scheduled by the first PDCCH.

2. The method of transmitting the HARQ-ACK codebook according to claim 1, wherein,
   the first downlink transmission comprises at least one of a Physical Downlink Shared Channel (PDSCH) scheduled by a PDCCH, a Semi-Persistent Scheduling (SPS) PDSCH, and a SPS PDSCH release;
   the second downlink transmission comprises at least one of a Physical Downlink Shared Channel (PDSCH) scheduled by a PDCCH and a SPS PDSCH release.

3. The method of transmitting the HARQ-ACK codebook according to claim 1, wherein in a case that the semi-static HARQ-ACK codebook does not comprise HARQ-ACK feedback information corresponding to the first downlink transmission, the first downlink transmission is determined as follows:
   determining a downlink transmission that meets a first preset condition as the first downlink transmission; or, determining a downlink transmission that meets a second preset condition as the first downlink transmission; or, determining a downlink transmission that meets the first preset condition or the second preset condition as the first downlink transmission; or, determining a downlink transmission that meets both the first preset condition and the second preset condition as the first downlink transmission;

wherein, the first preset condition comprises:

a condition that an end symbol of the downlink transmission is later than a first reference symbol, wherein the first reference symbol is a first symbol or a first downlink symbol or a first flexible symbol, which is T1 time before a start position of a start symbol of an uplink channel carrying the HARQ-ACK codebook; or a condition that an end symbol or an end time of the downlink transmission is later than a first reference time, wherein the first reference time is T1 time before a start position of a start symbol of an uplink channel carrying the HARQ-ACK codebook; or a condition that a time interval between an end symbol or an end time of the downlink transmission and a start symbol or a start time of an uplink channel carrying the HARQ-ACK codebook is shorter than T1 time;

wherein, T1 is a predefined value; or, T1 is a value determined based on a configuration; or, T1 is a minimum processing delay of a HARQ-ACK feedback for the downlink transmission;

wherein, the second preset condition comprises:

a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying the HARQ-ACK codebook; or a condition that an end symbol or an end time of a PDCCH corresponding to the downlink transmission is later than a second reference time, wherein the second reference time is T2 time before a start position of a start symbol of an uplink channel carrying the HARQ-ACK codebook; or a condition that a time interval between an end symbol or an end time of a PDCCH corresponding to the downlink transmission and a start symbol or a start time of an uplink channel carrying the HARQ-ACK codebook is shorter than T2 time;

wherein, T2 is a predefined value; or, T2 is a value determined based on a configuration; or, T2 is a minimum processing delay of a HARQ-ACK of the downlink transmission to be multiplexed with other information for transmission.

4. The method of transmitting the HARQ-ACK codebook according to claim 3, wherein, T1 is calculated according to either of the following formulas:

$$T1=(N_1+d_{1,1})\cdot(2048+144)\cdot\kappa\cdot 2^{-\mu_1}\cdot T_C;$$

$$T1=(N_1+d_{1,1}+1)\cdot(2048+144)\cdot\kappa\cdot 2^{-\mu_1}\cdot T_C;$$

wherein, in a case that the downlink transmission is a PDSCH scheduled by a PDCCH, $\mu_1$ is a index of a minimum subcarrier spacing among subcarrier spacings corresponding respectively to the PDCCH scheduling the PDSCH, the PDSCH and a PUCCH, or $\mu_1$ is a index of a subcarrier spacing, for obtaining a largest T1 value, among subcarrier spacings corresponding respectively to the PDCCH scheduling the PDSCH, the PDSCH, and a PUCCH;

and/or, in a case that the downlink transmission is a SPS PDSCH release, $\mu_1$ is a index of a minimum subcarrier spacing among subcarrier spacings corresponding respectively to a PDCCH indicating the SPS PDSCH release and a PUCCH, or $\mu_1$ is a index of a subcarrier spacing, for obtaining a largest T1 value, among subcarrier spacings corresponding respectively to a PDCCH indicating the SPS PDSCH release and a PUCCH;

and/or, in a case that the downlink transmission is a SPS PDSCH, $\mu_1$ is a index of a minimum subcarrier spacing among subcarrier spacings corresponding respectively to the SPS PDSCH and a PUCCH, or $\mu_1$ is a index of a subcarrier spacing, for obtaining a largest T1 value, among subcarrier spacings corresponding respectively to the SPS PDSCH and a PUCCH;

$N_1$ is a value determined based on $\mu_1$ and a terminal capability;

$d_{1,1}$ is a value related to a transmission duration of the downlink transmission, a mapping type and the terminal capability;

$T_c$ is a basic time unit of a New Radio (NR) system;

k is a ratio between a basic time unit of a Long Time Evolution (LTE) system and the basic time unit of the NR system;

or, wherein, in a case that the uplink channel carrying the semi-static HARQ-ACK codebook is a PUCCH, T2 is calculated according to any of the following formulas:

$$T2=\max((N_2+1)\cdot(2048+144)\cdot\kappa\cdot 2^{-\mu_2}\cdot T_C, d_{1,2})$$

$$T2=(N_2+1)\cdot(2048+144)\cdot\kappa\cdot 2^{-\mu_2}\cdot T_C$$

wherein, in a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH;

$N_2$ is a value determined based on $\mu_2$ and a terminal capability;

in a case that the PDCCH corresponding to the downlink transmission triggers a Bandwidth Part (BWP) switching, $d_{1,2}$ is time required for the BWP switching, otherwise $d_{1,2}=0$;

$T_c$ is a basic time unit in a NR system;

k is a ratio between a basic time unit of a LTE system and the basic time unit of the NR system;

or, wherein, in a case that the uplink channel carrying the semi-static HARQ-ACK codebook is a PUSCH, T2 is calculated according to any of the following formulas:

$$T2=\max((N_2+1)\cdot(2048+144)\cdot\kappa\cdot 2^{-\mu_3}\cdot T_C, d_{1,2})$$

$$T2=(N_2+1)\cdot(2048+144)\cdot\kappa\cdot 2^{-\mu_3}\cdot T_C$$

$$T2=\max((N_2+d_{2,1}+1)\cdot(2048+144)\cdot\kappa\cdot 2^{-\mu_4}\cdot T_C, d_{2,2})$$

$$T2=\max((N_2+1)\cdot(2048+144)\cdot\kappa\cdot 2^{-\mu_4}\cdot T_C, d_{2,2})$$

$$T2=(N_2+d_{2,1}+1)\cdot(2048+144)\cdot\kappa\cdot 2^{-\mu_4}\cdot T_C$$

$$T2=\max((Z+d)\cdot(2048+144)\cdot\kappa\cdot 2^{-\mu_5}\cdot T_C, d_{2,2})$$

$$T2=(Z+d)\cdot(2048+144)\cdot\kappa\cdot 2^{-\mu_5}\cdot T_C$$

wherein, $\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH;

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH;

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an Aperiodic-Channel State Information-Reference Signal (A-CSI-RS) corresponding to the PDCCH corresponding to the PUSCH, or $\mu_5$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH;

in a case that a first symbol of the PUSCH only comprises a Demodulation Reference Signal (DMRS), $d_{2,1}=0$, otherwise $d_{2,1}=1$;

in a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI);

d is a quantity of overlapping symbols between a PDCCH and a scheduled PDSCH;

$T_c$ is a basic time unit in a NR system;

k is a ratio between a basic time unit of a LTE system and the basic time unit of the NR system.

5. The method of transmitting the HARQ-ACK codebook according to claim 1, wherein, in a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

6. A method of transmitting a hybrid automatic retransmission request acknowledgment (HARQ-ACK) codebook, applied to a base station, comprising:

receiving a semi-static HARQ-ACK codebook, wherein the semi-static HARQ-ACK codebook does not comprise HARQ-ACK feedback information corresponding to a target downlink transmission, the target downlink transmission comprises at least one of the following transmissions:

a first downlink transmission that does not meet a processing delay requirement;

a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

7. The method of transmitting the HARQ-ACK codebook according to claim 6, wherein, the first downlink transmission comprises at least one of a Physical Downlink Shared Channel (PDSCH) scheduled by a PDCCH, a Semi-Persistent Scheduling (SPS) PDSCH, and a SPS PDSCH release;

the second downlink transmission comprises at least one of a Physical Downlink Shared Channel (PDSCH) scheduled by a PDCCH and a SPS PDSCH release.

8. The method of transmitting the HARQ-ACK codebook according to claim 6, wherein, prior to receiving the semi-static HARQ-ACK codebook, the method further comprises:

determining a length of the semi-static HARQ-ACK codebook.

9. The method of transmitting the HARQ-ACK codebook according to claim 8, wherein, in a case that the semi-static HARQ-ACK codebook does not comprise HARQ-ACK feedback information corresponding to the first downlink transmission, the first downlink transmission is further determined as follows:

determining a downlink transmission that meets a first preset condition as the first downlink transmission; or, determining a downlink transmission that meets a second preset condition as the first downlink transmission; or, determining a downlink transmission that meets a first preset condition or a second preset condition as the first downlink transmission; or, determining a downlink transmission that meets both a first preset condition and a second preset condition as the first downlink transmission;

wherein, the first preset condition comprises:

a condition that an end symbol of the downlink transmission is later than a first reference symbol, wherein the first reference symbol is a first symbol or a first downlink symbol or a first flexible symbol, which is T1 time before a start position of a start symbol of an uplink channel carrying a HARQ-ACK codebook; or a condition that an end symbol or an end time of the downlink transmission is later than a first reference time, wherein the first reference time is T1 time before a start position of a start symbol of an uplink channel carrying a HARQ-ACK codebook; or a condition that a time interval between an end symbol or an end time of the downlink transmission and a start symbol or a start time of an uplink channel carrying the HARQ-ACK codebook is shorter than T1 time;

wherein, T1 is a predefined value; or, T1 is a value determined based on a configuration; or, T1 is a minimum processing delay of a HARQ-ACK feedback for the downlink transmission;

wherein, the second preset condition comprises:

a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying a HARQ-ACK codebook; or a condition that an end symbol or an end time of a PDCCH corresponding to the downlink transmission is later than a second reference time, wherein the second reference time is T2 time before a start position of a start symbol of an uplink channel carrying the HARQ-ACK codebook; or a condition that a time interval between an end symbol or an end time of a PDCCH corresponding to the downlink transmission and a start symbol or a start time of an uplink channel carrying the HARQ-ACK codebook is shorter than T2 time;

wherein, T2 is a predefined value; or, T2 is a value determined based on a configuration; or, T2 is a minimum processing delay of a HARQ-ACK of the downlink transmission to be multiplexed with other information for transmission.

10. The method of transmitting the HARQ-ACK codebook according to claim 9, wherein, T1 is calculated according to either of the following formulas:

$$T1 = (N_1 + d_{1,1}) \cdot (2048 + 144) \cdot \kappa \cdot 2^{-\mu_1} \cdot T_C;$$

$$T1 = (N_1 + d_{1,1} + 1) \cdot (2048 + 144) \cdot \kappa \cdot 2^{-\mu_1} \cdot T_C;$$

wherein, in a case that the downlink transmission is a PDSCH scheduled by a PDCCH, $\mu_1$ is an index of a minimum subcarrier spacing among subcarrier spacings corresponding respectively to the PDCCH scheduling the PDSCH, the PDSCH and a PUCCH, or $\mu_1$ is an index of a subcarrier spacing, for obtaining a largest T1 value, among subcarrier spacings corresponding respectively to the PDCCH scheduling the PDSCH, the PDSCH, and a PUCCH; and/or, in a case that the downlink transmission is a SPS PDSCH release, $\mu_1$ is an index of a minimum subcarrier spacing among subcarrier spacings corresponding respectively to a PDCCH indicating the SPS PDSCH release and a PUCCH, or $\mu_1$ is an index of a subcarrier spacing, for obtaining a largest T1 value, among subcarrier spacings corresponding respectively to a PDCCH indicating the SPS PDSCH release and a PUCCH; and/or, in a case that the downlink transmission is a SPS PDSCH, $\mu_1$ is an index of a minimum subcarrier spacing among subcarrier spacings corresponding respectively to the SPS PDSCH and a PUCCH, or $\mu_1$ is an index of a subcarrier spacing, for obtaining a largest T1 value, among subcarrier spacings corresponding respectively to the SPS PDSCH and a PUCCH;

$N_1$ is a value determined based on $\mu_1$ and a terminal capability;

$d_{1,1}$ is a value related to a transmission duration of the downlink transmission, a mapping type and the terminal capability;

$T_C$ is a basic time unit in a NR system;

k is a ratio between a basic time unit of a LTE system and the basic time unit of the NR system;

or, wherein, in a case that the uplink channel carrying the semi-static HARQ-ACK codebook is a PUCCH, T2 is calculated according to any of the following formulas:

$$T2 = \max((N_2 + 1) \cdot (2048 + 144) \cdot \kappa \cdot 2^{-\mu_2} \cdot T_C, d_{1,2})$$

$$T2 = (N_2 + 1) \cdot (2048 + 144) \cdot \kappa \cdot 2^{-\mu_2} \cdot T_C$$

wherein, in a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH;

$N_2$ is a value determined based on $\mu_2$ and a terminal capability;

in a case that the PDCCH corresponding to the downlink transmission triggers a Bandwidth Part (BWP) switching, $d_{1,2}$ is time required for the BWP switching, otherwise $d_{1,2} = 0$;

$T_C$ is a basic time unit in a NR system;

k is a ratio between a basic time unit of a LTE system and the basic time unit of the NR system;

or, wherein, in a case that the uplink channel carrying the semi-static HARQ-ACK codebook is a PUSCH, T2 is calculated according to any of the following formulas:

$$T2 = \max((N_2 + 1) \cdot (2048 + 144) \cdot \kappa \cdot 2^{-\mu_3} \cdot T_C, d_{1,2})$$

$$T2 = (N_2 + 1) \cdot (2048 + 144) \cdot \kappa \cdot 2^{-\mu_3} \cdot T_C$$

$$T2 = \max((N_2 + d_{2,1} + 1) \cdot (2048 + 144) \cdot \kappa \cdot 2^{-\mu_4} \cdot T_C, d_{2,2})$$

$$T2 = \max((N_2 + 1) \cdot (2048 + 144) \cdot \kappa \cdot 2^{-\mu_4} \cdot T_C, d_{2,2})$$

$$T2 = (N_2 + d_{2,1} + 1) \cdot (2048 + 144) \cdot \kappa \cdot 2^{-\mu_4} \cdot T_C$$

$$T2 = \max((Z + d) \cdot (2048 + 144) \cdot \kappa \cdot 2^{-\mu_5} \cdot T_C, d_{2,2})$$

$$T2 = (Z + d) \cdot (2048 + 144) \cdot \kappa \cdot 2^{-\mu_5} \cdot T_C$$

wherein, $\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH;

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH;

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an Aperiodic-Channel State Information-Reference Signal (A-CSI-RS) corresponding to the PDCCH corresponding to the PUSCH, or $\mu_5$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH;

in a case that a first symbol of the PUSCH only comprises a Demodulation Reference Signal (DMRS), $d_{2,1}=0$, otherwise $d_{2,1}=1$;

in a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI);

d is a quantity of overlapping symbols between a PDCCH and a scheduled PDSCH;

$T_c$ is a basic time unit in a NR system;

k is a ratio between a basic time unit of a LTE system and the basic time unit of the NR system.

11. The method of transmitting the HARQ-ACK codebook according to claim 6, wherein,
in a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

12. A base station, comprising: a transceiver, a storage, a processor and a program stored on the storage and executable by the processor;
wherein the program, when executed by the processor, implements the steps of the method of transmitting the HARQ-ACK codebook according to claim 6.

13. The base station according to claim 12, wherein,
the processor is configured to read the program in the storage to implement the following process: prior to receiving the semi-static HARQ-ACK codebook, determining a length of the semi-static HARQ-ACK codebook.

14. The base station according to claim 13, wherein,
the processor is further configured to determine, in a case that the semi-static HARQ-ACK codebook does not comprise HARQ-ACK feedback information corresponding to the first downlink transmission, the first downlink transmission as follows:

determining a downlink transmission that meets a first preset condition as the first downlink transmission; or,
determining a downlink transmission that meets a second preset condition as the first downlink transmission; or,
determining a downlink transmission that meets a first preset condition or a second preset condition as the first downlink transmission; or,
determining a downlink transmission that meets both a first preset condition and a second preset condition as the first downlink transmission;

wherein, the first preset condition comprises:
a condition that an end symbol of the downlink transmission is later than a first reference symbol, wherein the first reference symbol is a first symbol or a first downlink symbol or a first flexible symbol, which is T1 time before a start position of a start symbol of an uplink channel carrying a HARQ-ACK codebook; or
a condition that an end symbol or an end time of the downlink transmission is later than a first reference time, wherein the first reference time is T1 time before a start position of a start symbol of an uplink channel carrying the HARQ-ACK codebook; or
a condition that a time interval between an end symbol or an end time of the downlink transmission and a start symbol or a start time of an uplink channel carrying the HARQ-ACK codebook is shorter than T1 time;

wherein, T1 is a predefined value; or, T1 is a value determined based on a configuration; or, T1 is a minimum processing delay of a HARQ-ACK feedback for the downlink transmission;

wherein, the second preset condition comprises:
a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying the HARQ-ACK codebook; or
a condition that an end symbol or an end time of a PDCCH corresponding to the downlink transmission is later than a second reference time, wherein the second reference time is T2 time before a start position of a start symbol of an uplink channel carrying the HARQ-ACK codebook; or
a condition that a time interval between an end symbol or an end time of a PDCCH corresponding to the downlink transmission and a start symbol or a start time of an uplink channel carrying the HARQ-ACK codebook is shorter than T2 time;

wherein, T2 is a predefined value; or, T2 is a value determined based on a configuration; or, T2 is a minimum processing delay of a HARQ-ACK of the downlink transmission to be multiplexed with other information for transmission.

15. The base station according to claim 14, wherein, T1 is calculated according to either of the following formulas:

$$T1=(N_1+d_{1,1})\cdot(2048+144)\cdot\kappa\cdot 2^{-\mu_1}\cdot T_C;$$

$$T1=(N_1+d_{1,1}+1)\cdot(2048+144)\cdot\kappa\cdot 2^{-\mu_1}\cdot T_C;$$

wherein, in a case that the downlink transmission is a PDSCH scheduled by a PDCCH, $\mu_1$ is an index of a minimum subcarrier spacing among subcarrier spacings corresponding respectively to the PDCCH scheduling the PDSCH, the PDSCH and a PUCCH, or $\mu_1$ is an index of a subcarrier spacing, for obtaining a largest T1 value, among subcarrier spacings corresponding respectively to the PDCCH scheduling the PDSCH, the PDSCH, and a PUCCH; and/or, in a case that the downlink transmission is a SPS PDSCH release, $\mu_1$ is an index of a minimum subcarrier spacing among subcarrier spacings corresponding respectively to a PDCCH indicating the SPS PDSCH release and a PUCCH, or $\mu_1$ is an index of a subcarrier spacing, for obtaining a largest T1 value, among subcarrier spacings corresponding respectively to a PDCCH indicating the SPS PDSCH release and a PUCCH; and/or, in a case that the downlink transmission is a SPS PDSCH, $\mu_1$ is an index of a minimum subcarrier spacing among subcarrier spacings corresponding respectively to the SPS PDSCH and a PUCCH, or $\mu_1$ is an index of a subcarrier spacing, for obtaining a largest T1 value, among subcarrier spacings corresponding respectively to the SPS PDSCH and a PUCCH;

$N_1$ is a value determined based on $\mu_1$ and a terminal capability;

$d_{1,1}$ is a value related to a transmission duration of the downlink transmission, a mapping type and the terminal capability;

$T_c$ is a basic time unit in a NR system;

k is a ratio between a basic time unit of a LTE system and the basic time unit of the NR system;

or, in a case that the uplink channel carrying the semi-static HARQ-ACK codebook is a PUCCH, T2 is calculated according to either of the following formulas:

$$T2=\max((N_2+1)\cdot(2048+144)\cdot\kappa\cdot 2^{-\mu_2}\cdot T_C, d_{1,2})$$

$$T2=(N_2+1)\cdot(2048+144)\cdot\kappa\cdot 2^{-\mu_2}\cdot T_C$$

wherein, in a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH;

$N_2$ is a value determined based on $\mu_2$ and a terminal capability;

in a case that the PDCCH corresponding to the downlink transmission triggers a Bandwidth Part (BWP) switching, $d_{1,2}$ is time required for the BWP switching, otherwise $d_{1,2}=0$;

$T_c$ is a basic time unit in a NR system;

k is a ratio between a basic time unit of a LTE system and the basic time unit of the NR system;

or, in a case that the uplink channel carrying the semi-static HARQ-ACK codebook is a PUSCH, T2 is calculated according to any of the following formulas:

$$T2=\max((N_2+1)\cdot(2048+144)\cdot\kappa\cdot 2^{-\mu_3}\cdot T_C, d_{1,2})$$

$$T2=(N_2+1)\cdot(2048+144)\cdot\kappa\cdot 2^{-\mu_3}\cdot T_C$$

$$T2=\max((N_2+d_{2,1}+1)\cdot(2048+144)\cdot\kappa\cdot 2^{-\mu_4}\cdot T_C, d_{2,2})$$

$$T2=\max((N_2+1)\cdot(2048+144)\cdot\kappa\cdot 2^{-\mu_4}\cdot T_C, d_{2,2})$$

$$T2=(N_2+d_{2,1}+1)\cdot(2048+144)\cdot\kappa\cdot 2^{-\mu_4}\cdot T_C$$

$$T2=\max((Z+d)\cdot(2048+144)\cdot\kappa\cdot 2^{-\mu_5}\cdot T_C, d_{2,2})$$

$$T2=(Z+d)\cdot(2048+144)\cdot\kappa\cdot 2^{-\mu_5}\cdot T_C$$

wherein, $\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH;

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH;

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an Aperiodic-Channel State Information-Reference Signal (A-CSI-RS) corresponding to the PDCCH corresponding to the PUSCH, or $\mu_5$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH;

in a case that a first symbol of the PUSCH only comprises a Demodulation Reference Signal (DMRS), $d_{2,1}=0$, otherwise $d_{2,1}=1$;

in a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI);

d is a quantity of overlapping symbols between a PDCCH and a scheduled PDSCH;

$T_c$ is a basic time unit in a NR system;

k is a ratio between a basic time unit of a LTE system and the basic time unit of the NR system.

16. The base station according to claim 12, wherein, the processor is further configured to indicate, in a case that the semi-static HARQ-ACK codebook is transmitted on a PUCCH, if there are semi-static HARQ-ACK codebooks for multiple downlink transmissions that need to be transmitted on a same PUCCH simultaneously, a same PUCCH resource in a PUCCH resource indication field of the PDCCH for scheduling the multiple downlink transmissions.

17. A terminal, comprising: a transceiver, a storage, a processor and a program stored on the storage and executable by the processor; wherein,
the transceiver is configured to send a semi-static HARQ-ACK codebook, wherein the semi-static HARQ-ACK codebook does not comprise HARQ-ACK feedback information corresponding to a target downlink transmission, the target downlink transmission comprises at least one of the following transmissions:
a first downlink transmission that does not meet a processing delay requirement;
a second downlink transmission corresponding to a second PDCCH which is transmitted after a first PDCCH, wherein the semi-static HARQ-ACK codebook is transmitted on a Physical Uplink Shared Channel (PUSCH) scheduled by the first PDCCH.

18. The terminal according to claim 17, wherein,
the processor is configured to read the program in the storage to implement the following process: in a case that the semi-static HARQ-ACK codebook does not comprise HARQ-ACK feedback information corresponding to the first downlink transmission, prior to sending a semi-static HARQ-ACK codebook corresponding to the downlink transmission, the first downlink transmission is further determined as follows:
determining a downlink transmission that meets a first preset condition as the first downlink transmission; or,
determining a downlink transmission that meets a second preset condition as the first downlink transmission; or,
determining a downlink transmission that meets a first preset condition or a second preset condition as the first downlink transmission; or,
determining a downlink transmission that meets both a first preset condition and a second preset condition as the first downlink transmission;
wherein, the first preset condition comprises:
a condition that an end symbol of the downlink transmission is later than a first reference symbol, wherein the first reference symbol is a first symbol or a first downlink symbol or a first flexible symbol, which is T1 time before a start position of a start symbol of an uplink channel carrying a HARQ-ACK codebook; or
a condition that an end symbol or an end time of the downlink transmission is later than a first reference time, wherein the first reference time is T1 time before a start position of a start symbol of an uplink channel carrying a HARQ-ACK codebook; or
a condition that a time interval between an end symbol or an end time of the downlink transmission and a start symbol or a start time of an uplink channel carrying the HARQ-ACK codebook is shorter than T1 time;
wherein, T1 is a predefined value; or, T1 is a value determined based on a configuration; or, T1 is a minimum processing delay of a HARQ-ACK feedback for the downlink transmission;
wherein, the second preset condition comprises:
a condition that an end symbol of a PDCCH corresponding to the downlink transmission is later than a second reference symbol, wherein the second reference symbol is a first symbol or a first downlink symbol or a first flexible symbol, which is T2 time before a start position of a start symbol of an uplink channel carrying the HARQ-ACK codebook; or a condition that an end symbol or an end time of a PDCCH corresponding to the downlink transmission is later than a second reference time, wherein the second reference time is T2 time before a start position of a start symbol of an uplink channel carrying the HARQ-ACK codebook; or
a condition that a time interval between an end symbol or an end time of a PDCCH corresponding to the downlink transmission and a start symbol or a start time of an uplink channel carrying the HARQ-ACK codebook is shorter than T2 time;
wherein, T2 is a predefined value; or, T2 is a value determined based on a configuration; or, T2 is a minimum processing delay of a HARQ-ACK of the downlink transmission to be multiplexed with other information for transmission.

19. The terminal according to claim 18, wherein, T1 is calculated according to either of the following formulas:

$$T1=(N_1+d_{1,1})\cdot(2048+144)\cdot\kappa\cdot 2^{-\mu_1}\cdot T_C;$$

$$T1=(N_1+d_{1,1}+1)\cdot(2048+144)\cdot\kappa\cdot 2^{-\mu_1}\cdot T_C$$

wherein, in a case that the downlink transmission is a PDSCH scheduled by a PDCCH, $\mu_1$ is an index of a minimum subcarrier spacing among subcarrier spacings corresponding respectively to the PDCCH scheduling the PDSCH, the PDSCH and a PUCCH, or $\mu_1$ is an index of a subcarrier spacing, for obtaining a largest T1 value, among subcarrier spacings corresponding respectively to the PDCCH scheduling the PDSCH, the PDSCH, and a PUCCH; and/or, in a case that the downlink transmission is a SPS PDSCH release, $\mu_1$ is an index of a minimum subcarrier spacing among subcarrier spacings corresponding respectively to a PDCCH indicating the SPS PDSCH release and a PUCCH, or $\mu_1$ is an index of a subcarrier spacing, for obtaining a largest T1 value, among subcarrier spacings corresponding respectively to a PDCCH indicating the SPS PDSCH release and a PUCCH; and/or, in a case that the downlink transmission is a SPS PDSCH, $\mu_1$ is an index of a minimum subcarrier spacing among subcarrier spacings corresponding respectively to the SPS PDSCH and a PUCCH, or $\mu_1$ is an index of a subcarrier spacing, for obtaining a largest T1 value, among subcarrier spacings corresponding respectively to the SPS PDSCH and a PUCCH;
$N_1$ is a value determined based on $\mu_1$ and a terminal capability;
$d_{1,1}$ is a value related to a transmission duration of the downlink transmission, a mapping type and the terminal capability;
$T_c$ is a basic time unit in a NR system;
k is a ratio between a basic time unit of a LTE system and the basic time unit of the NR system;
or, in a case that the uplink channel carrying the semi-static HARQ-ACK codebook is a PUCCH, T2 is calculated according to either of the following formulas:

$$T2=\max((N_2+1)\cdot(2048+144)\cdot\kappa\cdot 2^{-\mu_2}\cdot T_C,d_{1,2})$$

$$T2=(N_2+1)\cdot(2048+144)\cdot\kappa\cdot 2^{-\mu_2}\cdot T_C$$

wherein, in a case that the downlink transmission is a PDSCH scheduled by a PDCCH, $\mu_2$ is an index of a minimum subcarrier spacing among subcarrier spacings corresponding respectively to the PDCCH scheduling the PDSCH, the PDSCH, and the PUCCH, or $\mu_2$ is an index of a subcarrier spacing, for obtaining a largest T1 value, among subcarrier spacings corresponding respectively to the PDCCH scheduling the PDSCH, the PDSCH, and the PUCCH; and/or, in a case that the downlink transmission is a SPS PDSCH release, $\mu_2$ is an index of a minimum subcarrier spacing among subcarrier spacings corresponding respectively to a PDCCH indicating the SPS PDSCH release and the PUCCH, or $\mu_2$ is an index of a subcarrier spacing, for obtaining a largest T1 value, among subcarrier spacings corresponding respectively to a PDCCH indicating the SPS PDSCH release and the PUCCH; and/or, in a case that the downlink transmission is a SPS PDSCH, $\mu_2$ is an index of a minimum subcarrier spacing among subcarrier spacings corresponding respectively to the SPS PDSCH and the PUCCH, or $\mu_2$ is an index of a subcarrier spacing, for obtaining a largest T1 value, among subcarrier spacings corresponding respectively to the SPS PDSCH and the PUCCH;

$N_2$ is a value determined based on $\mu_2$ and a terminal capability;

in a case that the PDCCH corresponding to the downlink transmission triggers a Bandwidth Part (BWP) switching, $d_{1,2}$ is time required for the BWP switching, otherwise $d_{1,2}=0$;

$T_c$ is a basic time unit in a NR system;

k is a ratio between a basic time unit of a LTE system and the basic time unit of the NR system;

or, in a case that the uplink channel carrying the semi-static HARQ-ACK codebook is a PUSCH, T2 is calculated according to any of the following formulas:

$$T2=\max((N_2+1)\cdot(2048+144)\cdot\kappa\cdot 2^{-\mu_3}\cdot T_C, d_{1,2})$$

$$T2=(N_2+1)\cdot(2048+144)\cdot\kappa\cdot 2^{-\mu_3}\cdot T_C$$

$$T2=\max((N_2+d_{2,1}+1)\cdot(2048+144)\cdot\kappa\cdot 2^{-\mu_4}\cdot T_C, d_{2,2})$$

$$T2=\max((N_2+1)\cdot(2048+144)\cdot\kappa\cdot 2^{-\mu_4}\cdot T_C, d_{2,2})$$

$$T2=(N_2+d_{2,1}+1)\cdot(2048+144)\cdot\kappa\cdot 2^{-\mu_4}\cdot T_C$$

$$T2=\max((Z+d)\cdot(2048+144)\cdot\kappa\cdot 2^{-\mu_5}\cdot T_C, d_{2,2})$$

$$T2=(Z+d)\cdot(2048+144)\cdot\kappa\cdot 2^{-\mu_5}\cdot T_C$$

wherein, $\mu_3$ is an index of a minimum subcarrier spacing among subcarrier spacings corresponding respectively to the PDCCH corresponding to the downlink transmission, a PUCCH, and the PUSCH, or $\mu_3$ is an index of a subcarrier spacing, for obtaining a largest T2 value, among subcarrier spacings corresponding respectively to the PDCCH corresponding to the downlink transmission, a PUCCH, and the PUSCH;

$\mu_4$ is an index of a minimum subcarrier spacing among subcarrier spacings corresponding respectively to the PDCCH corresponding to the downlink transmission and/or a PDCCH corresponding to the PUSCH, a PUCCH, and the PUSCH, or $\mu_4$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, and the PUSCH;

$\mu_5$ is an index of a minimum subcarrier spacing among subcarrier spacings corresponding respectively to the PDCCH corresponding to the downlink transmission and/or a PDCCH corresponding to the PUSCH, a PUCCH, the PUSCH and an Aperiodic-Channel State Information-Reference Signal (A-CSI-RS) corresponding to the PDCCH corresponding to the PUSCH, or $\mu_5$ is an index of a subcarrier spacing, for obtaining a largest T2 value, among subcarrier spacings corresponding respectively to the PDCCH corresponding to the downlink transmission and/or a PDCCH corresponding to the PUSCH, a PUCCH, the PUSCH and an A-CSI-RS corresponding to the PDCCH corresponding to the PUSCH;

in a case that a first symbol of the PUSCH only comprises a Demodulation Reference Signal (DMRS), $d_{2,1}=0$, otherwise $d_{2,1}=1$;

in a case that the PDCCH corresponding to the PUSCH triggers a Bandwidth Part (BWP) switching, $d_{2,2}$ is time required for the BWP switching, otherwise $d_{2,2}=0$;

Z is a time delay corresponding to Aperiodic-Channel State Information (A-CSI);

d is a quantity of overlapping symbols between a PDCCH and a scheduled PDSCH;

$T_c$ is a basic time unit in a NR system;

k is a ratio between a basic time unit of a LTE system and the basic time unit of the NR system.

20. The terminal according to claim 17, wherein,
in a case that the semi-static HARQ-ACK codebook is transmitted on a PUCCH, if there are semi-static HARQ-ACK codebooks for multiple downlink transmissions that need to be transmitted on a same PUCCH simultaneously, a PUCCH resource indication field in multiple PDCCHs for scheduling the multiple downlink transmissions indicates a same PUCCH resource.

* * * * *